US006727418B2

(12) United States Patent
Matsumoto

(10) Patent No.: US 6,727,418 B2
(45) Date of Patent: Apr. 27, 2004

(54) MUSICAL SCORE DISPLAY APPARATUS AND METHOD

(75) Inventor: Shuichi Matsumoto, Hamamatsu (JP)

(73) Assignee: Yamaha Corporation (JP)

( * ) Notice: Subject to any disclaimer, the term of this patent is extended or adjusted under 35 U.S.C. 154(b) by 92 days.

(21) Appl. No.: 10/189,264

(22) Filed: Jul. 3, 2002

(65) Prior Publication Data

US 2003/0005814 A1 Jan. 9, 2003

(30) Foreign Application Priority Data

Jul. 3, 2001 (JP) ........................................ 2001-202356
Jul. 3, 2001 (JP) ........................................ 2001-202357

(51) Int. Cl.$^7$ ............................................. G09B 15/02
(52) U.S. Cl. ................................. 84/477 R; 84/483.1
(58) Field of Search ...................... 84/477 R, 600–603, 84/645, 470 R, 483.1

(56) References Cited

U.S. PATENT DOCUMENTS

| | | | | |
|---|---|---|---|---|
| 5,773,741 A | * | 6/1998 | Eller et al. ..................... | 84/609 |
| 5,894,100 A | | 4/1999 | Otsuka ...................... | 84/477 R |
| 6,046,394 A | * | 4/2000 | Hino ........................ | 84/477 R |
| 6,072,114 A | * | 6/2000 | Kunimasa ................. | 84/477 R |
| 6,380,471 B2 | * | 4/2002 | Matsumoto ............... | 84/477 R |
| 6,392,132 B2 | * | 5/2002 | Uehara ...................... | 84/477 R |
| 6,414,231 B1 | * | 7/2002 | Miyamoto et al. ......... | 84/477 R |
| 6,459,029 B2 | * | 10/2002 | Uehara ...................... | 84/477 R |
| 6,515,210 B2 | * | 2/2003 | Shibukawa ................ | 84/477 R |
| 2001/0037719 A1 | * | 11/2001 | Gardner et al. ................ | 84/478 |
| 2001/0054347 A1 | * | 12/2001 | Uehara ...................... | 84/477 R |
| 2002/0011143 A1 | * | 1/2002 | Uehara ........................ | 84/478 |
| 2002/0134216 A1 | * | 9/2002 | Shibukawa ................ | 84/477 R |
| 2003/0110924 A1 | * | 6/2003 | Miyamoto ................. | 84/477 R |
| 2003/0110925 A1 | * | 6/2003 | Sitrick et al. ........... | 844/477 R |

* cited by examiner

*Primary Examiner*—Robert Nappi
*Assistant Examiner*—David Warren
(74) *Attorney, Agent, or Firm*—Rossi & Associates

(57) ABSTRACT

Musical score of a music piece is divided into a plurality of displaying portions, and display progression information is supplied which defines a shift or jump, in the displaying portions, of a performed measure based on a repeat sign. Next displaying portion to be displayed following a current displaying portion is determined, and display switching timing at which the current performance progression of the music piece shifts from the current displaying portion to the next displaying portion is detected on the basis of the display progression information and performance progression information. By switching between the displaying portions in response to detection of the display switching timing, sequential switching from the current displaying portion to the next displaying portion can take place appropriately in accordance with progression of the performance. Because the display progression information pre-defines a shift of the performed measure based on a repeat sign, it is possible to readily perform the switching between the displaying portions in response to such a shift or jump of the performed measure. Also, score portions of a plurality of displaying portions can be displayed side by side on a display screen, in which case a next score displaying section (including a plurality of displaying portions) to be displayed following a current score displaying section (including a plurality of displaying portions) is determined in accordance with the display progression information.

12 Claims, 12 Drawing Sheets

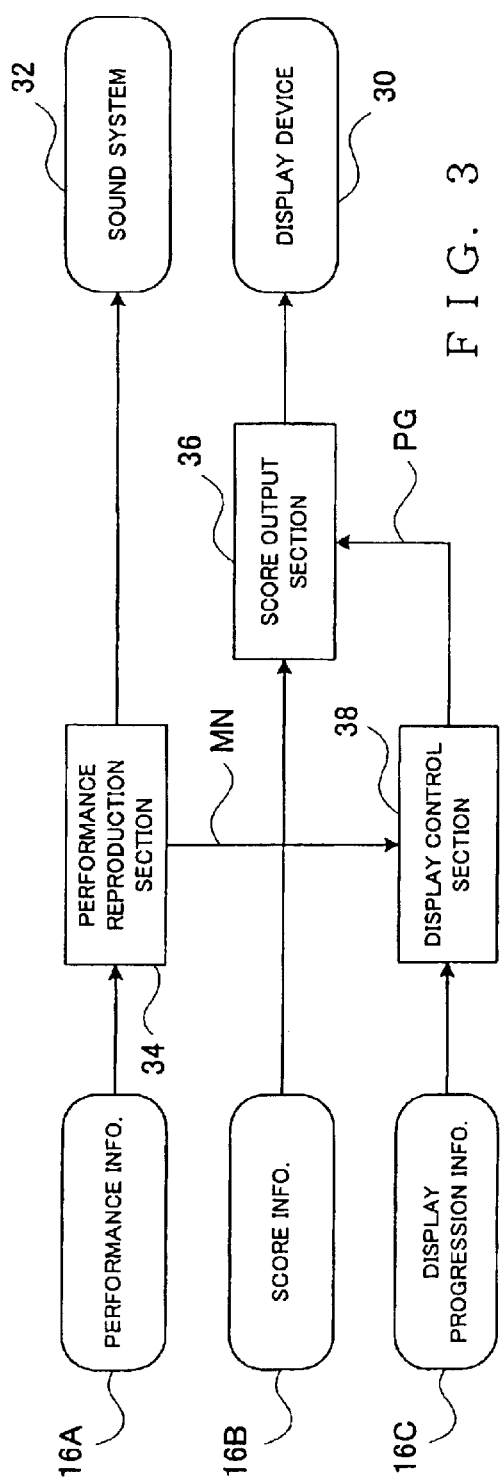

```
     A     B
   ┌──┴──┐ ↓
   D₁:001│1│000    @SEQ_SPEC    43  xx xx xx xx  @EE  [ PAGE NO.1 ]
   D₂:003│1│000    @SEQ_SPEC    43  xx xx xx xx  @EE  [ REPEAT START ]
   D₃:004│1│000    @SEQ_SPEC    43  xx xx xx xx  @EE  [ PAGE NO.2 ]
   D₄:007│1│000    @SEQ_SPEC    43  xx xx xx xx  @EE  [ REPEAT END ]
   D₅:008│1│000    @SEQ_SPEC    43  xx xx xx xx  @EE  [ to Coda ]
   D₆:009│1│000    @SEQ_SPEC    43  xx xx xx xx  @EE  [ PAGE NO.3 ]
   D₇:017│1│000    @SEQ_SPEC    43  xx xx xx xx  @EE  [ D. C. ]
   D₈:017│1│000    @SEQ_SPEC    43  xx xx xx xx  @EE  [ Coda ]
   D₉:018│1│000    @SEQ_SPEC    43  xx xx xx xx  @EE  [ LAST MEASURE ]
                   └───┬───┘  └┬┘  └────┬─────┘
                       P        Q         R
```

| PERFORMED MEASURE | CURRENT PAGE | NEXT PAGE |
|---|---|---|
| 1 | 1 | 2 |
| 2 | 1 | 2 |
| 3 | 1 | 2 |
| 4 | 2 | 1 |
| 5 | 1 | 2 |
| 6 | 2 | 3 |
| 7 | 2 | 3 |
| 8 | 2 | 3 |
| 9 | 3 | 1 |
| 10 | 1 | 2 |
| ⋮ | ⋮ | ⋮ |

| PERFORMED MEASURE | CURRENT PAGE GROUP | | NEXT PAGE GROUP | |
|---|---|---|---|---|
| 1 | 1 | 2 | 3 | 2 |
| 2 | 1 | 2 | 3 | 2 |
| 3 | 1 | 2 | 3 | 2 |
| 4 | 1 DL | 2 | 3 | 2 |
| 5 | 1 | 2 | 3 | 2 |
| 6 | 3 | 2 | 3 | 1 |
| 7 | 3 | 2 | 3 | 1 |
| 8 | 3 | 2 | 3 | 1 |
| 9 | 3 | 1 | 2 | 1 |
| 10 | 2 | 1 | 2 | 3 |
| ⋮ | ⋮ | ⋮ | ⋮ | ⋮ |

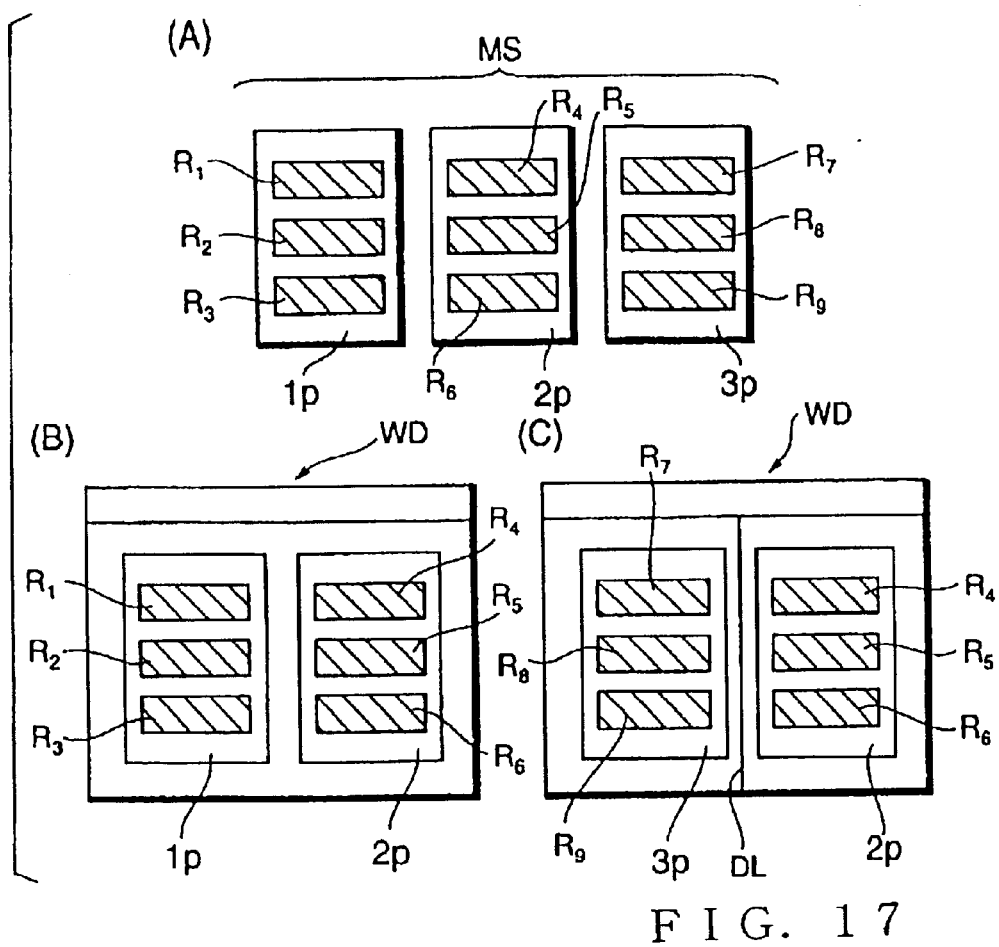
F I G. 1 7
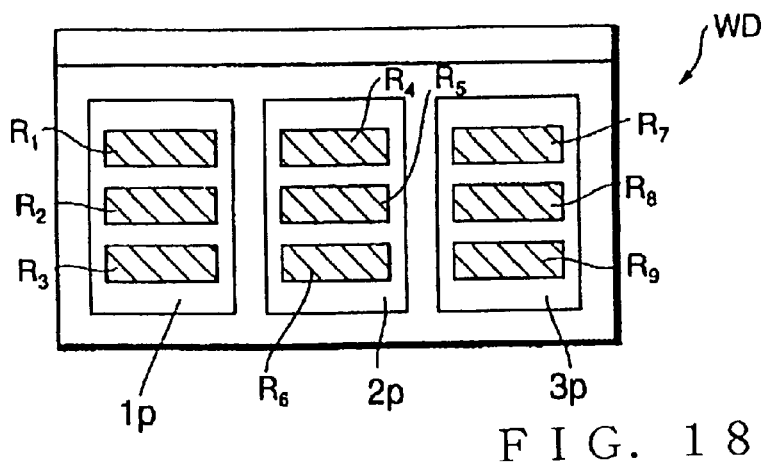
F I G. 1 8

MUSICAL SCORE DISPLAY APPARATUS AND METHOD

BACKGROUND OF THE INVENTION

The present invention relates generally to musical score display apparatus and methods for displaying a score of a music piece, for every one or more predetermined displaying portions, such as one or more displaying pages, in synchronism with an automatic or manual performance of the music piece.

Among conventionally-known examples of musical score display apparatus for displaying a score of a music piece in synchronism with an automatic or manual performance of the music piece is one disclosed in, for example, Japanese Patent Laid-open Publication No.HEI-10-254434, which includes first and second memories for storing score-displaying image data of current and next displaying pages, respectively. In the conventional musical score display apparatus, a "score portion" of the current displaying page (i.e., a portion of the musical score corresponding to the current displaying page) is displayed on a display device in accordance with the score-displaying image data stored in the first memory. As a performance of the former half of the score portion of the current displaying page is completed, the score-displaying image data of the former half of the next displaying page is transferred from the second memory to the first memory, so that the former half of the score portion of the next displaying page can be visually displayed on the display device. Further, in the conventional musical score display apparatus, score portions of two successive displaying pages can also be simultaneously displayed side by side in such a manner that as a performance of one of the displaying pages is completed, another displaying page, following the displaying page being currently performed in place of the performance-completed displaying page is newly displayed on the display device.

The conventional musical score display apparatus can display the score portions of the current and next displaying pages in a sequential manner. However, where, for example, a performed measure (i.e., to-be-performed measure) is to be shifted or jumped between a plurality of displaying pages on the basis of a repeat sign, there arises needs to search score information of the music piece for the repeat sign and destination displaying page (shifted-to displaying page) designated by the repeat sign, convert the score information of the destination displaying page into image data and then write the converted image data into the second memory. Therefore, the display control process would inevitably become very complicated.

Further, the conventional musical score display apparatus can simultaneously display, in a side-by-side relationship, the score portions of the currently-performed displaying page and next displaying page to be performed following the currently-performed displaying page, half of the score portion of the currently-performed page and half of the score portion of the next displaying page, etc., on the display screen. However, in the case where the performed measure is to be shifted or jumped between a plurality of displaying pages, for example, on the basis of a repeat sign, it is not easy to determine, in real time, a displaying page to be next performed on the basis of the score information etc., so that the display control process would become complicated.

SUMMARY OF THE INVENTION

In view of the foregoing, it is an object of the present invention to provide a novel musical score display apparatus and method which can greatly simplify a display control process for displaying, in synchronism with a performance, each individual displaying portion of a musical score where a performed measure shifts between a plurality of the displaying portions.

It is another object of the present invention to provide a novel musical score display apparatus and method which can greatly simplify a display control process for displaying, in synchronism with a performance, every predetermined plurality of displaying portions of a musical score where a performed measure shifts between a plurality of the displaying portions.

According to a first aspect of the present invention, there is provided an improved musical score display apparatus, which comprises: a performance progression information supply section that supplies performance progression information in accordance with performance progression of a given music piece; a score information supply section that supplies score information representative of a score of the given music piece; a display progression information supply section that supplies display progression information that divides the score of the music piece into a plurality of displaying portions and supplies display progression information to define a shift, in the displaying portions, of a performed measure based on a repeat sign; a first storage section; a second storage section; a first write section that, on the basis of the score information supplied by the score information supply section, converts score information of a current displaying portion, corresponding to current performance progression of the given music piece, into first score-displaying image data and writes the first score-displaying image data into the first storage section; a determination section that, in accordance with the display progression information, determines a next displaying portion to be displayed following the current displaying portion; a second write section that, on the basis of the score information supplied by the score information supply section, converts score information of the next displaying portion, determined by the determination section, into second score-displaying image data and writes the second score-displaying image data into the second storage section; a detection section that, on the basis of the performance progression information and the display progression information, detects display switching timing at which the current performance progression of the given music piece shifts from the current displaying portion to the next displaying portion; a transfer section that transfers the second score-displaying image data of the second storage section to the first storage section in response to detection, by the detection section, of the display switching timing, so that the first score-displaying image data written in the first storage section are replaced with the second score-displaying image data; and a display section that displays a score portion of the current displaying portion in accordance with the first score-displaying image data written in the first storage section.

When a score of a given music piece, divided into a plurality of displaying portions, is to be sequentially displayed, the musical score display apparatus of the present invention arranged as above can sequentially switch the displayed contents (displayed score portion) on the display section from the current displaying portion to the next displaying portion in accordance with progression of a performance. At that time, display progression information is supplied which defines a shift of a performed measure (i.e., to-be-performed measure) based on a repeat sign, and the next displaying portion to be displayed following the current displaying portion is determined in accordance with the display progression information. Also, on the basis of the performance progression information and the display progression information, detection is made of each display switching timing at which the current performance progression of the given music piece shifts from the current displaying portion to the next displaying portion. Such arrangements of the invention can readily designate the next displaying portion appropriately in response to a shift (jump) of the performed measure based on a repeat sign.

According to a second aspect of the present invention, there is provided a musical score display apparatus, which comprises a performance progression information supply section that supplies performance progression information in accordance with performance progression of a given music piece; a score information supply section that supplies score information representative of a score of the given music piece; a display progression information supply section that divides the score of the music piece into a plurality of displaying portions and supplies display progression information defining a shift, in the displaying portions, of a performed measure based on a repeat sign; a first storage section; a second storage section; a first write section that converts score information of a first predetermined score displaying section, of the score information supplied by the score information supply section, into first score-displaying image data, the first predetermined score displaying section being composed of a predetermined number of displaying portions corresponding to a performance sequence of the given music piece, and then writes the first score-displaying image data into the first storage section; a display section that, in accordance with the first score-displaying image data written in the first storage section, displays, in a side-by-side relationship, score portions of the predetermined number of displaying portions corresponding to the first score-displaying image data; a determination section that, in accordance with the display progression information, a second predetermined score displaying section to be displayed following the first predetermined score displaying section, the second predetermined score displaying section being composed of a predetermined number of displaying portions corresponding to the performance sequence of the given music piece, the second predetermined score displaying section including at least one of the displaying portions of the first predetermined score displaying section that is to be performed last in the first predetermined score displaying section and a displaying portion to be performed following the one displaying portion; a second write section that converts score information of the second predetermined score displaying section, of the score information supplied by the score information supply section, into second score-displaying image data, and then writes the second score-displaying image data into the second storage section; a detection section that detects display switching timing on the basis of the performance progression information and the display progression information; and a transfer section that transfers the second score-displaying image data of the second storage section to the first storage section in response to detection, by the detection section, of the display switching timing, so that the first score-displaying image data written in the first storage section are replaced with the second score-displaying image data to thereby switch displayed contents on the display section.

According to the second aspect, score portions of a first predetermined score displaying section (i.e. a predetermined plurality of displaying portions), corresponding to first score-displaying image data, are displayed, side by side, on the screen of the display section in accordance with the first score-displaying image data written or stored in the first storage section. At that time, display progression information is supplied which defines a shift of a performed measure (i.e., to-be-performed measure) based on a repeat sign, and the second predetermined score displaying section to be displayed following the first predetermined score displaying section is determined in accordance with the display progression information. Here, the second predetermined score displaying section includes at least one of the displaying portions of the first predetermined score displaying section that is to be performed last of all the displaying portions in the first predetermined score displaying section and a displaying portion to be performed following the one displaying portion. Also, detection is made of each display switching timing on the basis of the performance progression information and the display progression information, and the displayed score portions of the plurality of displaying portions can be switched from those of the first predetermined score displaying section to those of the second predetermined score displaying section in response to the detection of the display switching timing. Such arrangements can display score portions of appropriate displaying portions simultaneously, side by side, in accordance with performance progression, and can also readily designate the next displaying portion appropriately in response to a shift (jump) of the performed measure based on a repeat sign.

Note that the terms "repeat sign" as used in this specification do not necessarily refer to a repeat-instructing mark alone and embrace any one of all kinds of musical signs instructing a shift or jump of the performed measure, such as da capo, coda or dal segno.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the processor used in the present invention may comprise a dedicated processor with dedicated logic built in hardware, not to mention a computer or other general-purpose type processor capable of running a desired software program.

While the described embodiments represent the preferred form of the present invention, it is to be understood that various modifications will occur to those skilled in the art without departing from the spirit of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which:

FIG. 2 is a diagram showing an example of a data organization of display progression information employed in the first embodiment;

FIG. 3 is a functional block diagram outlining operation of the musical score display apparatus of FIG. 1;

FIG. 17 is a diagram showing another example of the musical score display in the second embodiment;

FIG. 18 is a diagram showing still another example of the musical score display in the second embodiment.

DETAILED DESCRIPTION OF EMBODIMENTS

Figure 1:
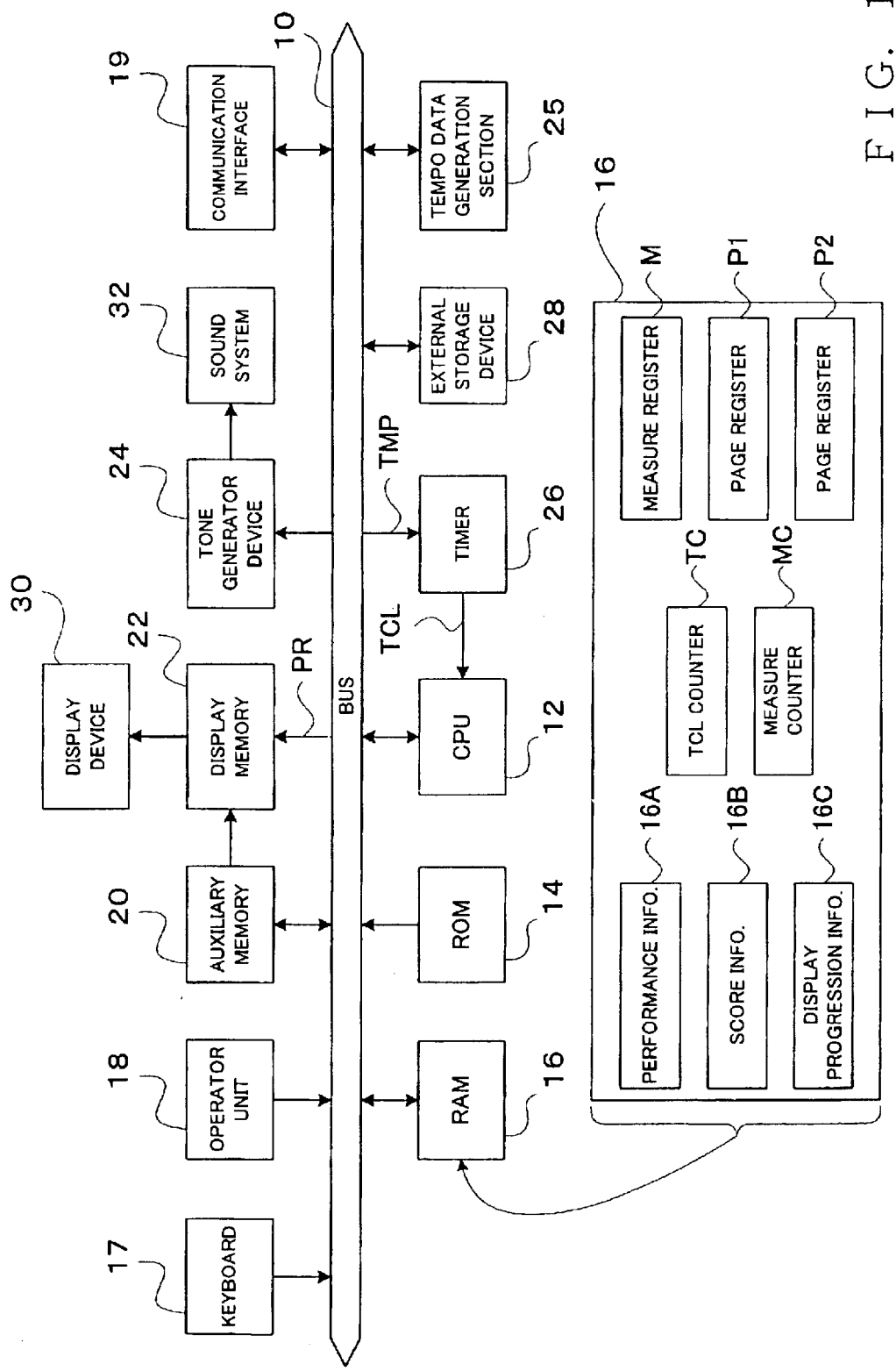
FIG. 1 is a block diagram showing an exemplary circuit organization of a musical score display apparatus in accordance with a first embodiment of the present invention.

First, a description will be made about a musical score display apparatus in accordance with a first embodiment of the present invention, with reference to FIGS. 1 to 9. In FIG. 1, the musical score display apparatus includes a bus 10, to which are connected a CPU (Central Processing Unit) 12, ROM (Read-Only Memory) 14, RAM (Random Access Memory) 16, operator unit 18, auxiliary memory 20, display memory 22, tone generator device 24, tempo data generation section 25, timer 26, external storage device 28, etc. The CPU 12 carries out various processes, such as an automatic performance process and musical score display process, in accordance with programs stored in the ROM 14, as will be later described in detail. In the ROM 14, there are prestored, in addition to various programs, various data indicative of musical staves, various notes, various rests, other musical symbols or signs, etc. that are used to convert score information of music pieces into score-displaying image data.

The RAM 16 includes many storage sections to be used by the CPU 12 in various operations. Primary examples of such storage sections, directly pertinent to implementation of the present invention, include a performance information storage section 16A, score information storage section 16B, display progression information storage section 16C, tempo clock (TCL) counter TC, measure counter MC, measure register M, page registers P1 and P2, etc.

The performance information storage section 16A is provided for storing performance information that describes performance contents of music pieces by use of key-on events, key-off events, relative times between events, etc. The score information storage section 16B is provided for storing score information describing score contents of music pieces by use of tone pitches, note types, rest types, etc. Further, the display progression information storage section 16C is provided for storing display progression information indicative of shifts or jumps, base on repeat signs, of a performed measure (to-be-performed measure) between displaying pages; in this embodiment, the score of each music piece is divided into a plurality of displaying pages (hereinafter referred to simply as "pages").

Figures 4, 5:
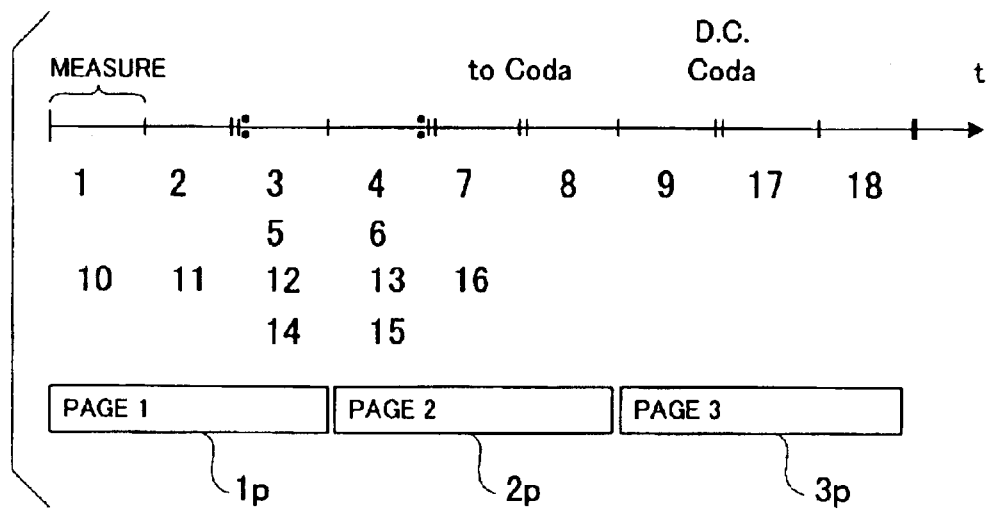
FIG. 4 is a diagram explanatory of a manner in which score displaying pages are determined by a display control section in the first embodiment.
FIG. 5 is a diagram explanatory of a manner in which current and next displaying pages are designated by the display control section in the first embodiment.

FIG. 2 shows an example of a data organization of the display progression information created as meta event information of MIDI information. The display progression information of FIG. 2 represents the score of a music piece divided into three pages (first, second and third pages $1p$, $2p$ and $3p$)as also illustrated in FIG. 4, and the display progression information indicates shifts or jumps, between pages, of the performed measure between the pages. As shown in FIG. 2, the display progression information includes data $D_1$ to $D_9$. In each of the data $D_1$ to $D_9$, "A" represents a performed measure number, "B" represents a first or leading beat, "P" a meta event mark, "Q" a maker mark, and "R" data contents. Here, the data contents indicate a page number 1, repeat start, etc., and correspondency between the performed measures and the data contents is shown by way of example in FIG. 2.

Referring back to FIG. 1, the tempo clock (TCL) counter TC is incremented by one each time a tempo clock signal TCL is generated by the timer 26. Automatic performance is executed by interrupt processing based on the tempo clock signals TCL. The measure counter MC is provided for sequentially counting measures of an automatic performance on the basis of the tempo clock signals TCL generated by the timer 26. The count or counted value of the measure counter MC represents a specific measure to be currently performed. To the measure register M is written the measure number (performed measure information) obtained from the measure counter MC. The pages registers P1 and P2 are provided for writing therein page numbers of current and next pages, respectively, designated with reference to the display progression information stored in the storage section 16C.

The operator unit 18 includes various operators provided on an operation panel of the musical score display apparatus. Among the operators directly pertinent to the implementation of the present invention are a music piece selecting operator, display start/stop switch, performance start/stop switch and tempo setting switch. The music piece selecting operator may be in the form of a pointing device such as a mouse.

The auxiliary memory 20 and display memory 22 are each capable of storing score-displaying image data on a page-by-page basis, and the image data stored in the auxiliary memory 20 are transferred to the display memory 22 in synchronism with display switching timing as will be later described.

The display device 30 is, for example, in the form of a liquid crystal display (LCD) device, which is capable of displaying a score portion of the page corresponding to the score-displaying image data written in the display memory 22 in accordance with these score-displaying image data; note that a score of each page will be called a "score portion" to distinguish from a score of an entire music piece. The tone generator device 24 has a plurality of tone generating channels, and a tone signal generated by any one of the tone generating channels is supplied to a sound system 32 for audible reproduction or sounding.

The tempo data generation section 25 generates tempo data TMP representative of a tempo value set via the tempo setting switch included in the operator unit 18. The timer 26 generates tempo clock signals TCL at a frequency corresponding to the tempo represented by the tempo data TMP. Each of the tempo clock signals TCL is given to the CPU 12 as an interrupt instruction signal, and thus the CPU 12 executes an automatic performance by interrupt processing based on the tempo clock signals TCL. The tempo indicated by the tempo data TMP can be variably set by manipulation of the tempo setting switch included in the operator unit 18.

To the external storage device 28 can be removably attached any one or more of storage media, such as a hard disk (HD), floppy disk (FD), compact disk (CD), digital versatile disk (DVD) and magneto-optical disk (MO). In the external storage device 28, there are prestored not only performance information of a great number of music pieces, but also score information and display progression information of the music pieces. With a desired storage medium attached to the external storage device 28, stored information of the attached storage medium can be transferred to the RAM 16. Further, if the attached storage medium is a writable storage medium such as a hard disk or floppy disk, stored information of the RAM 16 can be transferred to the storage medium for storage therein. The storage medium attached to the external storage device 28 can be used as program storage means in place of the ROM 14. In this case, a desired program stored in the attached storage medium is transferred from the external storage device 28 to the RAM 16, and the CPU 12 is caused to operate in accordance with the desired program thus stored in the RAM 16. Such an arrangement can facilitate version upgrade or addition of a program.

To execute an automatic performance, a user performs operation for selecting a desired music piece. Namely, the user manipulates the music piece selecting operator of the operator unit 18 to select a desired music piece while a listing of the plurality of music pieces prestored in the storage medium of the external storage device 28 is being visually shown on the display device 30. The performance information, score information and display progression information of the selected music piece is then written into the respective storage sections 16A, 16B and 16C of the RAM 16.

Once a start of a performance is instructed by the user via the performance start/stop switch included in the operator unit 18, the CPU 12 executes interrupt processing for an automatic performance each time the tempo clock signal TCL is generated. In the interrupt processing, the CPU 12 determines whether or not the performance information stored in the storage section 16A has any event to be sounded or silenced at timing corresponding to the current count of the tempo clock counter TC. If there is such an event to be sounded in the stored performance information, then the CPU 12 supplies the tone generator device 24 with tone-pitch designating information and tone-generation instructing signal corresponding to the event and thereby causes the tone generator device 24 to generate a tone signal with the tone pitch designated by the supplied tone-pitch designating information. If, on the other hand, there is such an event to be silenced in the stored performance information, the CPU 12 supplies the tone generator device 24 with tone-pitch designating information and tone-deadening instructing signal corresponding to the event and thereby causes the tone generator device 24 to start attenuating a tone signal having the tone pitch designated by the supplied tone-pitch designating information.

The following paragraphs outline operation of the musical score display apparatus of FIG. 1. In this figure, a performance reproduction section 34 corresponds to the above-mentioned interrupt processing executed by the CPU 12, which carries out an automatic performance of a music piece by supplying tone signals to the sound system 32 in accordance with the performance information stored in the performance information storage section 16A. Further, performed measure information MN indicative of a performed measure of the automatic performance is generated by the performance reproduction section 34.

Figure 6:
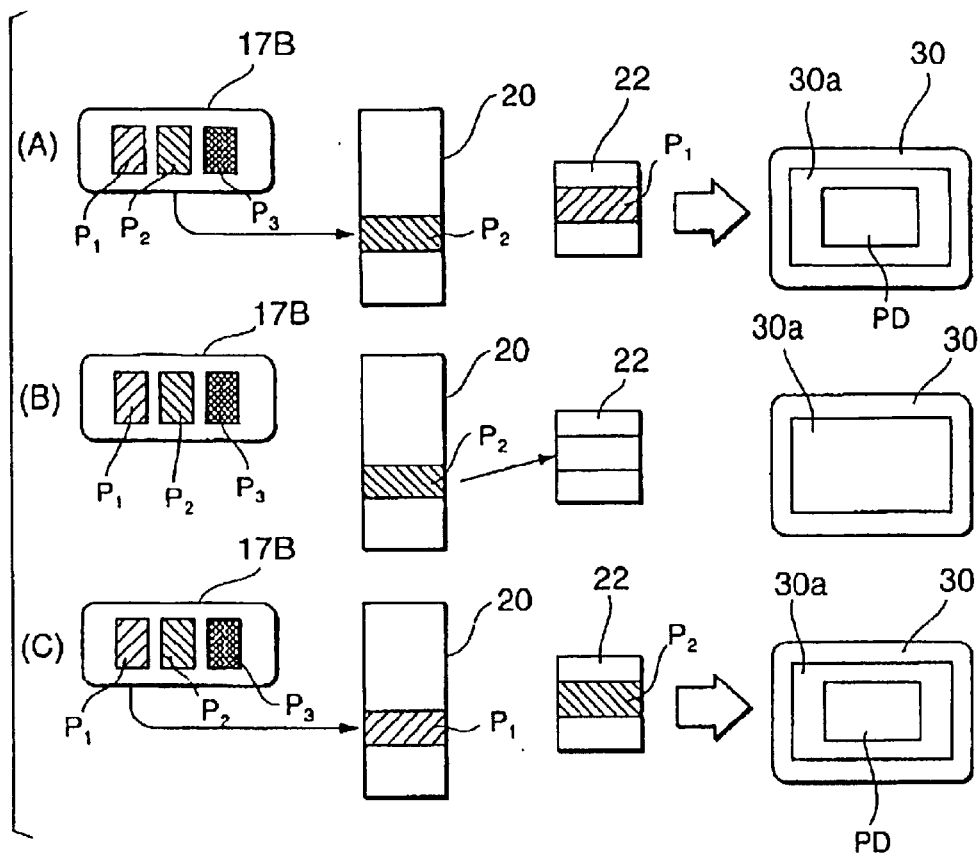
FIG. 6 is a diagram explanatory of data flows in a score output section in the first embodiment.

Score output section 36 includes the auxiliary memory 20 and display memory 22 as well as a conversion section 17B, as shown in section (A) of FIG. 6. For each page, the conversion section 17B converts the score information of the storage section 16B into score-displaying image data using predetermined converting data stored in the ROM 14. Reference numerals $P_1$, $P_2$ and $P_3$ represent image data of pages 1p, 2p and 3p. The score output section 36 writes the image data of each one page, sent from the conversion section 17B, into the auxiliary memory 20 or the display memory 22. Such writing of the image data into the auxiliary memory 20 or display memory 22 is controlled in accordance with page designating information PG supplied from a display control section 38.

The display control section 38 determines pages to be displayed currently and next (current and next pages), on the basis of the performed measure information MN supplied from the performance reproduction section 34 and the display progression information read out from the storage section 16C. The display control section 38 supplies the score output section 36 with page designating information PG designating the thus-determined current and next pages.

FIG. 4 is an example of pages determined using the display progression information of FIG. 2. In this instance, the automatic performance progresses as follows. After the first to fourth measures (i.e., "measure "1" to "measure 4") are sequentially performed, "measure 3" and "measure 4" are performed or repeated as "measure "5" and "measure 6" in accordance with a repeat sign. Then, "measure "7" to "measure 9" are sequentially performed, after which the performance returns to the beginning of the music piece in accordance with a da capo (D.C.). Then, "measure "1" to "measure 7" are again performed as "measure 10" to "measure 16", after which, in accordance with a "toCoda" mark, the performance shifts from measure "16" to "Coda" to sequentially perform "measure 17" and "measure 18". In the illustrated example, "measures 1"—"measure 3", "measure 5", "measure 10"—"measure 12" and measure 14" belong to the first page 1p, "measure "4", "measure 6", "measure 7", "measure 8", "measure 13", "measure 15" and "measure 16" belong to the second page 2p, and "measure 9", "measure 17" and "measure 18" belong to the third page 3p.

The current and next pages are determined for each performed measure designated by the performed measure information MN, and thus there can be obtained an example of correspondency as shown in FIG. 5. In the illustrated example of FIG. 5, the current page is the first page or "page 1" and next page is the second page or "page 2" for each of "performed measure "1" to "performed measure 3", and the current page becomes "page 2" and next page becomes "page 1" once the performed measure becomes "measure 4". The page designating information PG designates the current and next pages corresponding to the changing performed measures.

Figure 7:
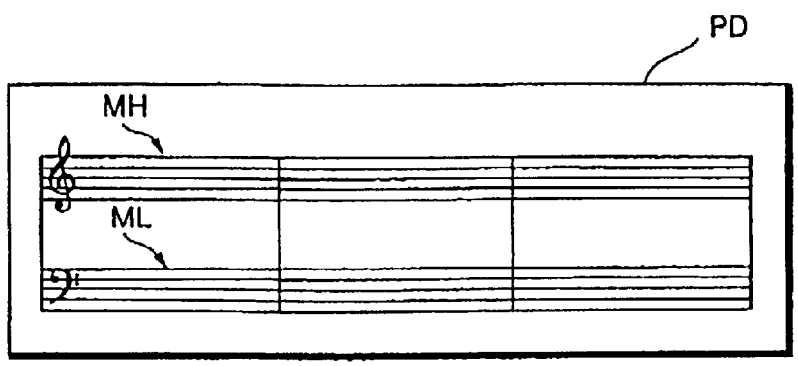
FIG. 7 is a diagram showing an example of displayed contents on a page display area of a display screen in the first embodiment.

Once the score output section 36 writes image data $P_1$ of "page 1" into the display memory 22, as shown in section (A) of FIG. 6, in response to designation, by the page designating information PG, of the current page ("page 1"), a score portion of "page 1" is displayed on a page display area PD of the display screen 30a of the display device 30. On the page display area PD, there can be displayed a score portion of three measures including a treble staff MH and bass staff ML, as shown in FIG. 7.

Into the auxiliary memory 20 are written image data $P_2$ of "page 2", as shown in section (A) of FIG. 6, in response to designation, by the page designating information PG, of the next page ("page 2"). Then, once the page designating information PG designates a new current page ("page 2") as the current page and new next page ("page 1") as the automatic performance shifts to "measure 4", the image data $P_2$ of "page 2" are transferred in blocks to the display memory 22. The transfer of the image data is executed instantly, so that the score portion of "page 2" is displayed in place of the score portion of "page 1". Also, image data $P_1$ of "page 1" are written into the auxiliary memory 20.

Figure 8:
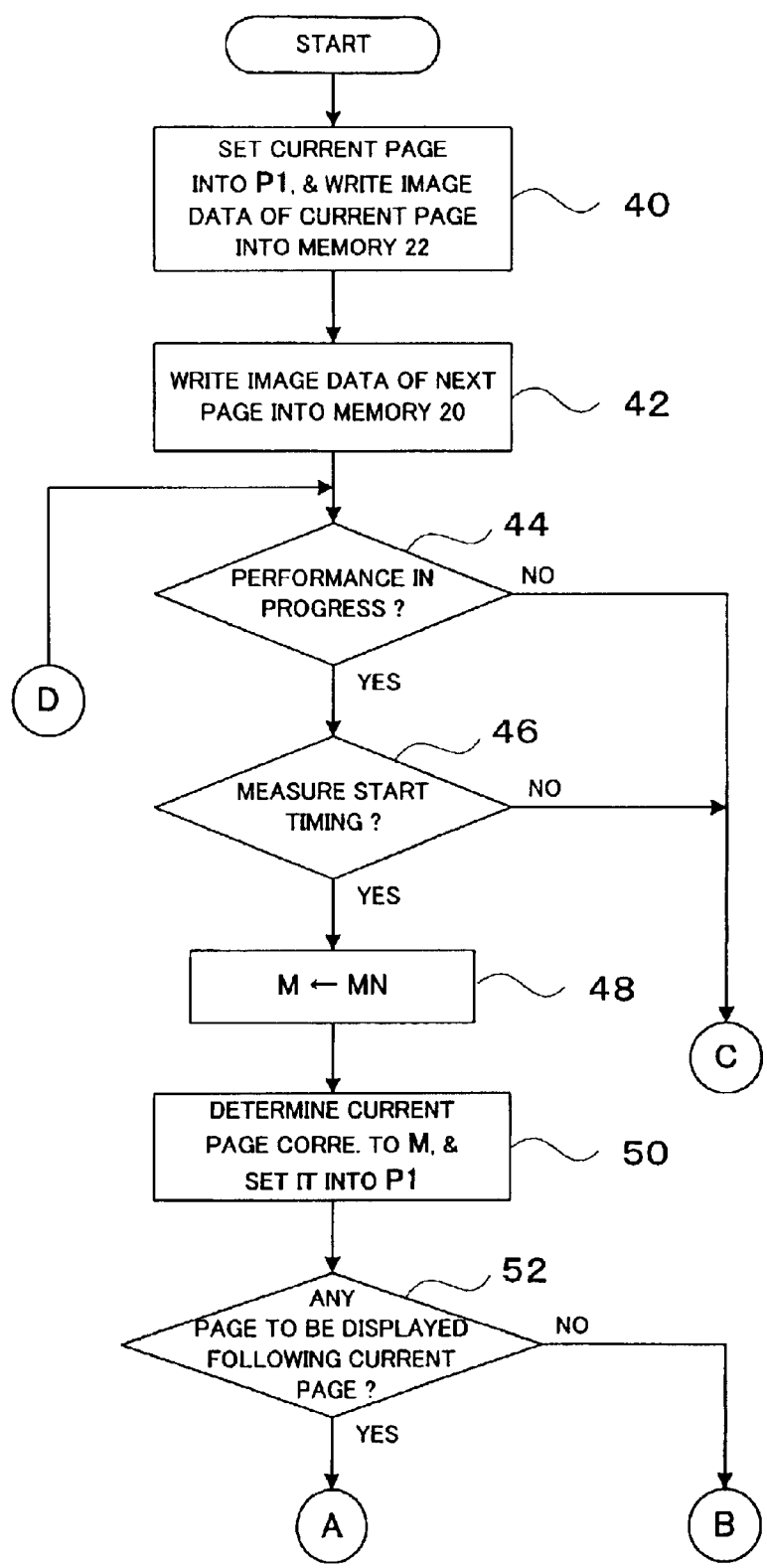
FIG. 8 is a flow chart showing a part of a musical score display process carried out in the first embodiment.
Figure 9:
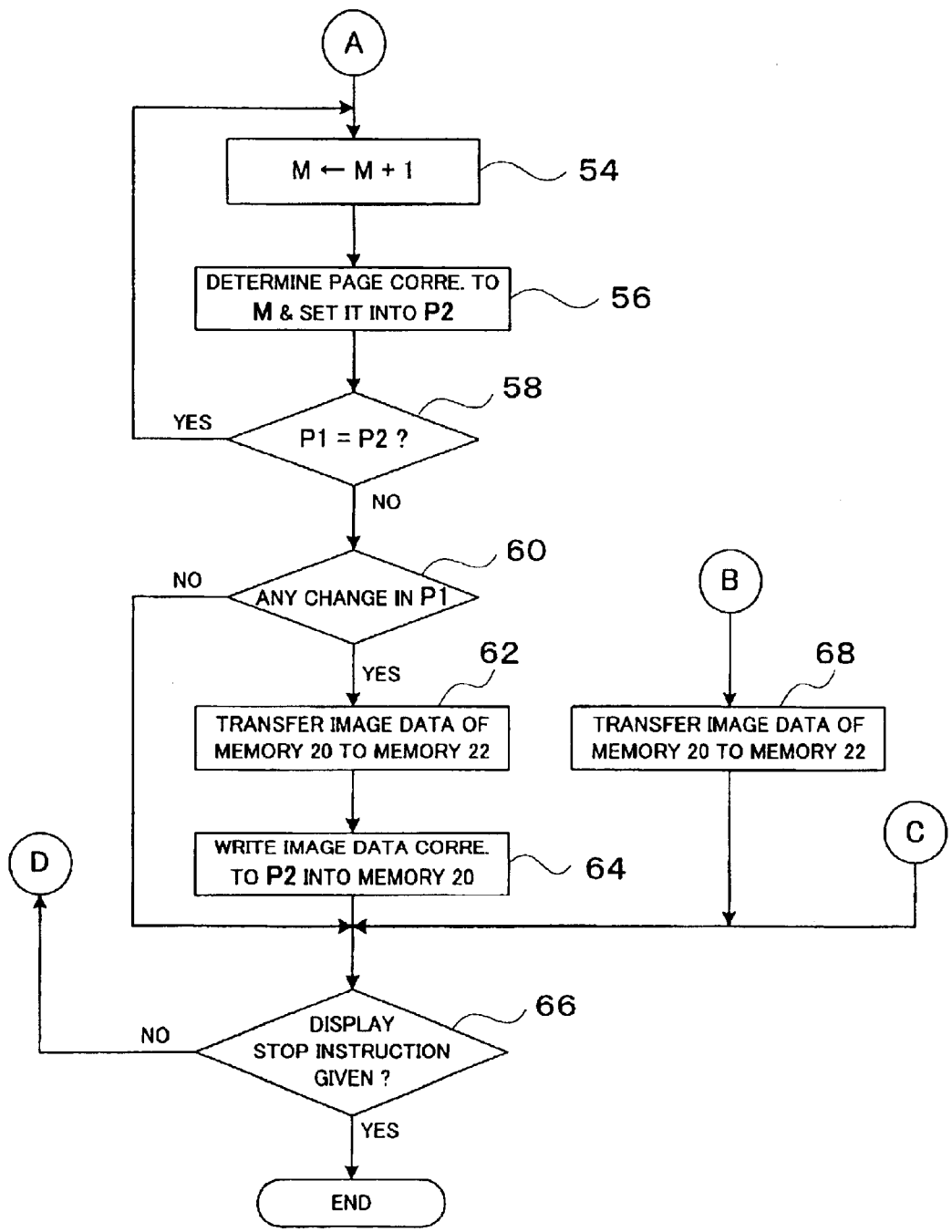
FIG. 9 is a flow chart showing the remaining part of the musical score display process.

FIGS. 8 and 9 are flow charts showing the musical score display process performed in the first embodiment, and this musical score display process corresponds to the above-described functions of the score output section 36 and display control section 38. The musical score display process of FIGS. 8 and 9 is started up in response to a display start instruction given by the user activating the display start/stop switch included in the operator unit 18.

At step 40, the page number of the current page is set into the current page register P1. Also, at this step, the score information of the current page, of the score information stored in the storage section 16B, is converted into image data, and the thus-converted image data are written into the display memory 22. As an example, if an automatic performance has not yet been initiated when a display start is instructed, "page 1" is determined as the current page, and the page number of the current page is set into the register P1. Also, the score information of "page 1" is converted into image data, and the thus-converted image data are written into the display memory 22, as shown in section (A) of FIG. 6. As a consequence, the score portion of "page 1" is displayed on the display screen 30a of the display device 30.

At step 42, a next page is determined on the basis of the display progression information stored in the storage section 16C. Also, at this step, the score information of the thus-determined next page, of the score information stored in the storage section 16B, is converted into image data, and the thus-converted image data are written into the auxiliary memory 20. The next page may be determined using a method as will be later described in relation to steps 54 to 58. In the example set forth above in relation to step 40, the next page is "page 2", and thus the image data of "page 2" are written into the auxiliary memory 20, as shown in section (A) of FIG. 6.

At next step 44, a determination is made as to whether or not an automatic performance is now in progress. If no automatic performance has been started yet as in the above example, a negative (NO) determination is made at step 44, so that the process moves on to step 66.

At step 66, it is determined whether or not a display stop instruction has been given by the user activating the display start/stop switch. If a negative (NO) determination is made at step 66, the process reverts to step 44, so as to wait for a start of an automatic performance with the score portion of "page 1" displayed on the display screen.

Once the user has given a performance start instruction via the performance start/stop switch included in the operator unit 18, an affirmative (YES) determination is made at step 44. Then, it is further determined at step 46 whether predetermined measure start timing has arrived, on the basis of the performed measure information MN. If answered in the negative at step 46, the process reverts to step 44 by way of step 66.

Once the determination becomes affirmative at step 46, the musical score display process proceeds to step 48, where the measure number designated by the performed measure information MN is set into the measure register M. Then, at step 50, the current page corresponding to the measure number currently set in the measure register M is determined with reference to the display progression information of the storage section 16C. At that time, the page number previously set in the register P1 (prior to this page number setting operation) is preserved in a predetermined register (not shown). This is because the preserved page number will be used to determine whether there has been a change in the value of the current page register P1. In the case where an automatic performance has been initiated with the score portion of "page 1" displayed as noted above, and once the start timing of "measure 1" is detected at step 46, a measure number "1" is set into the measure register M at step 48.

At step 52, a determination is made as to whether there is any page to be displayed following the current page represented by the data currently set in the register P1, with reference to the display progression information stored in the storage section 16C. In the case where "1" is set in the register P1 as noted above, there is such a page to be displayed following the current page of the register P1, an affirmative (YES) determination is made at step 52, so that the process moves on to step 54.

At step 54, the value of the measure register M is incremented by one. Then, the process moves to step 56, in order to determine a page corresponding to the measure number of the measure register M with reference to the display progression information stored in the storage section 16C. The page number of the thus-determined page is set into the register P2. In the case where "1" is set in the current page register P1 as noted above, page number "1" is set into the register P2 in correspondence with a measure number "2" currently set in the measure register M.

At step 58, a determination is made as to whether the page numbers currently stored in registers P1 and P2 are equal to each other. In the case where "1" is set in both of the registers P1 and P2 as noted above, an affirmative determination is made at step 58, and thus the display process reverts to step 54. Value "3" is set into the measure register M at step 54, and page number "1" is set into the register P2 in accordance with the measure number "3" now set in the measure register M. The page numbers currently stored in registers P1 and P2 are now equal to each other and thus an affirmative (YES) determination is made at step 58, so that the display process loops back to step 54. After that, a value "4" is set into the measure register M at step 54, and a page number "2" is set into the register P2. Thus, a negative (NO) determination is made at step 58. This means "page 2" different from "page 1" has been obtained.

Once the determination has become negative at step 58, the display process moves to step 60, where a determination is made as to whether there has been any change in the value of the current page register P1. Namely, a comparison is made between the page number stored in the predetermined register at step 50 and the page number stored in the current page register P1 at step 50. If the two stored page numbers do not match each other, an affirmative determination is made at step 60, while if the two stored page numbers match each other, a negative determination is made at step 60. In the case where "1" has been set in the register P1 as noted above, a negative determination is made at step 60, so that the display process reverts to step 44 by way of step 66. Then, the determination at step 44 becomes affirmative and the determination at step 46 becomes negative, so that the display process reverts to step 44 in order to repeat the above operations.

After that, once the predetermined start timing of "measure 2" arrives, the determination at step 46 becomes affirmative, so that the operations of steps 48 to 58 are repeated. As a consequence, the values set in the registers P1 and P2 become "1" and "2", respectively, and also the determination at step 60 becomes negative. Similarly, when the predetermined start timing of "measure 3" has arrived, the values set in the registers P1 and P2 become "1" and "2", respectively, and the determination at step 60 becomes negative.

Then, once the predetermined start timing of "measure 4" is reached, a measure number "4" is set into the measure register M at step 48, and a page number "2" is set into the register P1. Then, the value of the measure register M is incremented to "5" at step 54, and a page number "1" is set into the register P2 at step 56. Then, when the display process moves on to step 58 under these conditions, the determination at step 58 becomes negative because the values currently set in the registers P1 and P2 are "2" and "1", respectively, so that the display process goes to step 60.

Then, the determination at step 60 becomes affirmative now that the page number of the register P1 has changed from "1" to "2", and thus the process moves on to step 62. At step 62, the image data currently stored in the auxiliary memory 20 are transferred to the display memory 22 so that a score portion of the page corresponding to the transferred image data is displayed on the display device 30. In the case where "2" and "1" are set in the registers P1 and P2, respectively, as noted above, the image data of "page 2" are transferred to the display memory 22 and score data of "page 2" are displayed on the display screen 30a of the display device 30 as shown in sections (B) and (C) of FIG. 6, because, in this case, the image data of "page 2" are currently stored in the auxiliary memory 20.

At next step 64, the score information corresponding to the page number currently set in the register P2, of the score information stored in the storage section 16B, is converted into image data, and the thus-converted image data are written into the auxiliary memory 20. In the case where "2" and "1" are set in the registers P1 and P2, respectively, as noted above, the score information of "page 1" is converted to image data and the converted image data are written into the auxiliary memory 20, as shown in section (C) of FIG. 6.

After completion of the operation at step 64, the display process reverts to step 44 by way of step 66, in order to repeat the operations at and after step 44. Therefore, for "measure 4" and subsequent measures as well, display switching is performed between the pages in synchronism with the automatic performance in generally the same manner as described above. In the illustrated example of FIG. 5, such page switching takes place in "measure 4", "measure 5", "measure 6", "measure 9", "measure 10", etc.

Once the predetermined start timing of "measure 17" (see FIG. 4) arrives, a measure number "17" is set into the measure register M at step 48, and a page number "3" is set into the register P1 at step 50. Then, the determination at step 52 becomes negative because there is no page to be displayed following the current page ("page 3"), so that the display process goes to step 68.

At step 68, the image data currently stored in the auxiliary memory 20 are transferred to the display memory 22 so that a score portion of the page corresponding to the transferred image data is displayed on the display device 30. In the case where "3" is set in the current page register P1 as noted above, the image data of "page 2" and "page 3" are stored in the display memory 22 and auxiliary memory 20, respectively, so that the image data of "page 3" are transferred from the auxiliary memory 20 to the display memory 22, and thus a score portion of "page 3" is displayed on the display screen 30a of the display device 30. After completion of step 68, the display process reverts to step 44 by way of step 66.

Once the predetermined start timing of "measure 18" arrives, a measure number "18" is set into the measure register M at step 48. Then, the score portion of "page 3" is displayed on the display screen 30a through the above-described operations of steps 50, 52 and 68. Then, once the user has operated the performance start/stop switch to give a performance stop instruction upon completion of the automatic performance, the determination at step 44 becomes negative, so that the process reverts to step 44 by way of step 66. In this state, the score portion of "page 3" is being displayed on the display screen 30a.

Then, once the user has operated the display start/stop switch to give a display stop instruction, an affirmative determination is made at step 66, so that the musical score display process is brought to an end.

Whereas the embodiment has been described above in relation to the case where the performance start instruction is given after the display start instruction, it should be appreciated that the musical score display process is performed in the substantially same manner as described above even when the display start instruction and performance start instruction are given simultaneously.

However, in case the display start instruction is given after the performance start instruction, the musical score display process is carried out in the following manner.

Namely, at step 40, a current page is determined on the basis of the performed measure information MN and the display progression information stored in the storage section 16C, and the page number of the thus-determined current page is set into the current page register P1. Also, the score information of the current page, of the score information stored in the storage section 16B, is converted into image data, and the thus-converted image data are written into the display memory 22. As an example, if a display start instruction is given when the automatic performance has progressed to an enroute point of "measure 4" (see FIG. 4), then "page 2" is determined as the current page, and the page number of "page 2", i.e. "2", is set into the current page register P1. Further, the image data of "page 2" are written into the display memory 22, and thus the score portion of "page 2" is displayed on the display screen 30a of the display device 30.

At step 42, a next page is determined on the basis of the performed measure information MN and the display progression information stored in the storage section 16C. Also, the score information of the thus-determined next page, of the score information stored in the storage section 16B, is converted into image data, and the thus-converted image data are written into the auxiliary memory 20. In the case where "2" is set in the current page register P1 as noted above, "page 1" is determined as the next page, and thus the image data of "page 1" are written into the auxiliary memory 20.

Once the predetermined start timing of "measure 5" arrives, a measure number "5" is set into the measure register M at step 48, and page number "1" is set into the register P1 at step 50. Then, after incrementing the value of the measure register M to "6", a page number "2" is set into the register P2 at step 56. After that, the display process goes to step 60 by way of step 58. In this instance, an affirmative determination is made at step 60, and so the image data of "page 1" currently stored in the auxiliary memory 20 are transferred to the display memory 22 at step 62. As a consequence, the score portion of "page 1" is displayed on the display screen 30a of the display device 30. After that, the image data of "page 2" are written into the auxiliary memory 20 at step 64.

With the first embodiment of the invention arranged in the above-described manner, it is possible to display a musical score where a performed measure shifts between displaying pages in accordance with a repeat sign, on a page-by-page basis, in synchronism with an automatic performance. Further, because page designation responsive to a shift or jump of the performed measure is executed in accordance with the display progression information prestored in the storage section 16C, the first embodiment can greatly simplify the display control process. In addition, by transferring, to the display memory 22, the image data stored in the auxiliary memory 20, the first embodiment can quickly switch between the pages of the musical score.

Now, a description will be made about a second embodiment of the present invention, with reference to FIGS. 10 to 19. Some of the elements employed in the first embodiment shown in FIGS. 1 to 9 can be employed in the second embodiment, and these elements similar to those of the first embodiment will not be described here to avoid unnecessary duplication; that is, a description will be made about only elements of the second embodiment that are different from those of the first embodiment.

Figures 10, 11:
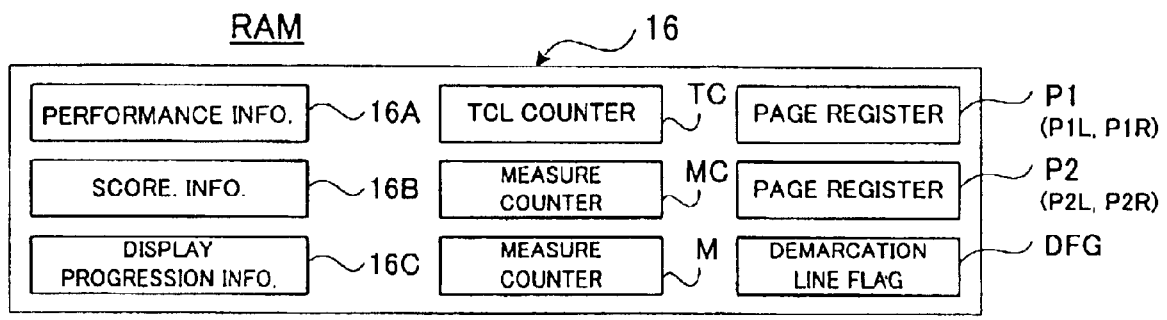
FIG. 10 is a block diagram showing an example of a storage section provided in a second embodiment of the musical score display apparatus.
FIG. 11 is a diagram explanatory of a manner in which current and next displaying page groups are designated in the second embodiment.

The second embodiment of the present invention may employ substantially the same hardware components as in the first embodiment. The second embodiment is different from the first embodiment in that the display device 30 in the second embodiment displays a plurality of pages, not just one page, of a musical score corresponding to score-displaying image data written in the display memory 22 in accordance with the score-displaying image data. Further, various storage sections provided in the RAM 16 in the second embodiment are slightly different from those provided in the RAM 16 in the first embodiment. FIG. 10 illustrates the storage sections provided in the RAM 16 in the second embodiment. As illustrated in the figure, a demarcation line flag DFG is added in the second embodiment.

In FIG. 10, the current page register P1, to which are written page numbers of pages to be currently displayed (current page group), includes a right portion P1R and left portion P1L, and the page numbers of such pages to be currently displayed on right and left areas of the display screen 30a of the display device 30 are written into the right portion P1R and left portion P1L, respectively. The page register P2 also includes a right portion P2R and left portion P2L for storing therein page numbers of pages to be next displayed (next page group), and the page numbers of such pages to be next displayed on the right and left areas of the display screen 30a of the display device 30 are written into the right portion P2R and left portion P2L, respectively. Value "1" is set into the demarcation line flag DFG when the arranged order of score portions (pages) to be displayed on the display device 30 does not conform to the ascending or increasing order of the page numbers.

The functional block diagram related to the display functions shown in FIG. 3 can also apply to the description of the second embodiment. However, in the second embodiment, the score output section 36 writes, into the auxiliary memory 20 or display memory 22, image data of a plurality of pages supplied from a score-information-to-image-data conversion section. Also, in the second embodiment, the display control section 38 determines current and next page groups on the basis of the performed measure information MN supplied from the performance reproduction section 34 and display progression information read out from the storage section 16C, and the display control section 38 supplies the score output section 36 with page designating information PG designating the determined current and next page groups.

The following paragraphs outline the second embodiment in relation to a case where a musical score including repeat signs, including a repeat-instructing mark, da capo, etc. is displayed using three pages 1p, 2p and 3p as illustrated in FIG. 4. In the second embodiment, two pages are displayed simultaneously, side by side, on the single screen of the display device 30. One of these two pages is one to which a currently-performed measure belongs (i.e., a current page), while the other page is one to which a measure group to be displayed following the current page (i.e., a next page). These two simultaneously-displayed pages (current and next pages) together constitute a "current page group". On the other hand, a "next page group" is made up of two pages that are to be displayed on the screen of the display device 30 following the current page group. For example, when the first measure of FIG. 4 is being performed, the first page 1p constitutes the current page, the second page 2p constitutes the next page, and the "current page group" is made up of the first and second pages 1p and 2p. This "current page group", which is made up of the first and second page 1p and 2p, is left unchanged till the performance progresses to the fifth measure. Once the performance has reached the sixth measure, the second page 2p becomes the current page and the third page 3p becomes the next page, so that the "current page group" switches to one made up of the second and third pages 2p and 3p. Thus, in this case, for each of the first to fifth measures where the "current page group" consists of the first and second pages 1p and 2p, the "next page group" consists of the second and third pages 2p and 3p.

FIG. 11 shows an example of correspondency between the performed measures and the current page groups and next page groups in a case where the second embodiment is applied to the example of the musical score as shown in FIG. 4 and where the current page group and next page group are determined for each of the performed measures designated by the performed measure information MN. In FIG. 11, the current page group consists of the first and second pages of page numbers "1" and "2" while the next page group consists of the third and second pages of page numbers "3" and "2", for each of "performed measure 1" to "performed measure 5". Once "performed measure 6" is reached, the current page group changes to one consisting of the third and second pages of page numbers "3" and "2" while the next page group changes to one consisting of the third and first pages of page numbers "3" and "1". Page designating information PG designates the corresponding current and next page groups for each of the performed measures.

Figure 12:
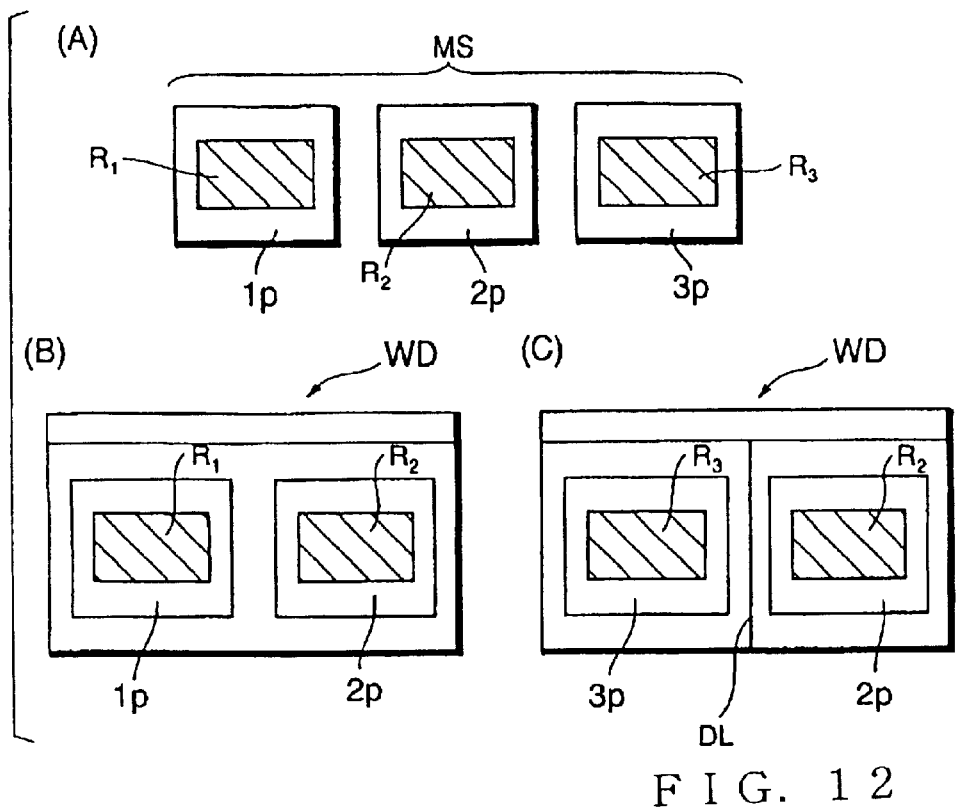
FIG. 12 is a diagram explanatory of score displaying operations carried out in the second embodiment.
Figure 13:
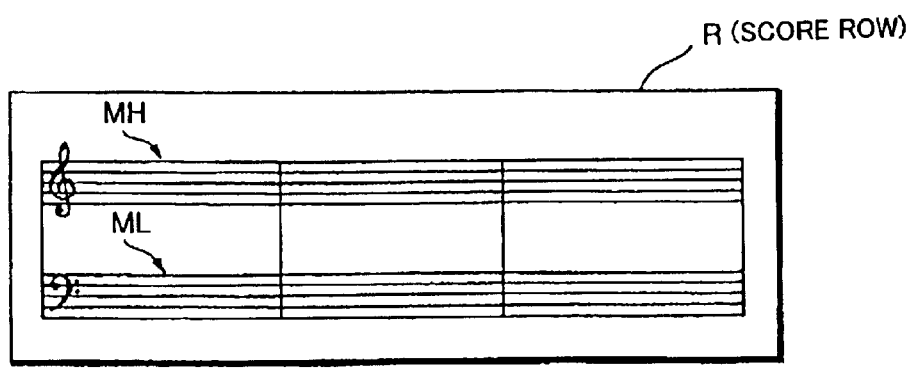
FIG. 13 is a diagram showing an example of a score row in the second embodiment.

When the score output section 36 (FIG. 3) writes, into the display memory 22, the image data of the first and second pages 1p and 2p in correspondence with page numbers "1" and "2" of the current page group designated by the page designating information PG, the score portions of the first and second pages 1p and 2p are displayed in a horizontal side-by-side relationship (layout) on a display window WD of the display screen of the display device 30. Section (A) of FIG. 12 shows a musical score MS including the first, second and third pages 1p, 2p and 3p, and the score portions of the first, second and third pages 1p, 2p and 3p have score rows $R_1$, $R_2$ and $R_3$, respectively. Each of the score rows may be of a three-measure format including a treble staff MH and bass staff ML as illustrated in FIG. 13. In the displayed score portions as illustrated in section (B) of FIG. 12, the score portions of the pages 1p and 2p have score rows $R_1$ and $R_2$, respectively.

The image data of the third page 3p and second page 2p are written into the auxiliary memory 20 (FIG. 3) in accordance with page numbers "3" and "2" of the next page group designated by the page designating information PG. After that, once the page designating information PG designates page numbers "3" and "2" of the current page group as the automatic performance shifts to measure 6", the image data of the third and second pages 3p and 2p currently written in the auxiliary memory 20 of FIG. 3 are transferred in blocks to the display memory 22. The transfer of the image data is executed instantly, and the score portions of the third and second pages 3p and 2p, having the score rows $R_3$ and $R_2$ as illustrated in section (C) of FIG. 12, are displayed in a horizontal side-by-side relationship on the display window WD.

If, at the time of the image data transfer, the arranged order of the displayed score portions does not conform to the ascending or increasing order of the page numbers just as in the case of the third and second pages 3p and 2p, the display control section 38 (FIG. 3) issues a write instruction signal for instructing the score output section 36 to write demarcation-line displaying data. In response to the write instruction signal, the score output section 36 writes the demarcation-line displaying data into the display memory 22 in relation to the image data read out from the auxiliary memory 20. As a consequence, a demarcation line DL extending vertically between the third and second pages 3p and 2p is displayed on the display window WD in accordance with the demarcation-line displaying data, as shown in section (C) of FIG. 12. The demarcation line DL indicates that the score portions of the third and second pages 3p and 2p are discrete or separated from each other at a position represented by the demarcation line DL.

After the image data have been transferred from the auxiliary memory 20 to the display memory 22, the image data of the third page 3p and first page 1p are written into the auxiliary memory 20 in accordance with page numbers "3" and "1" of the next page group.

Figure 14:
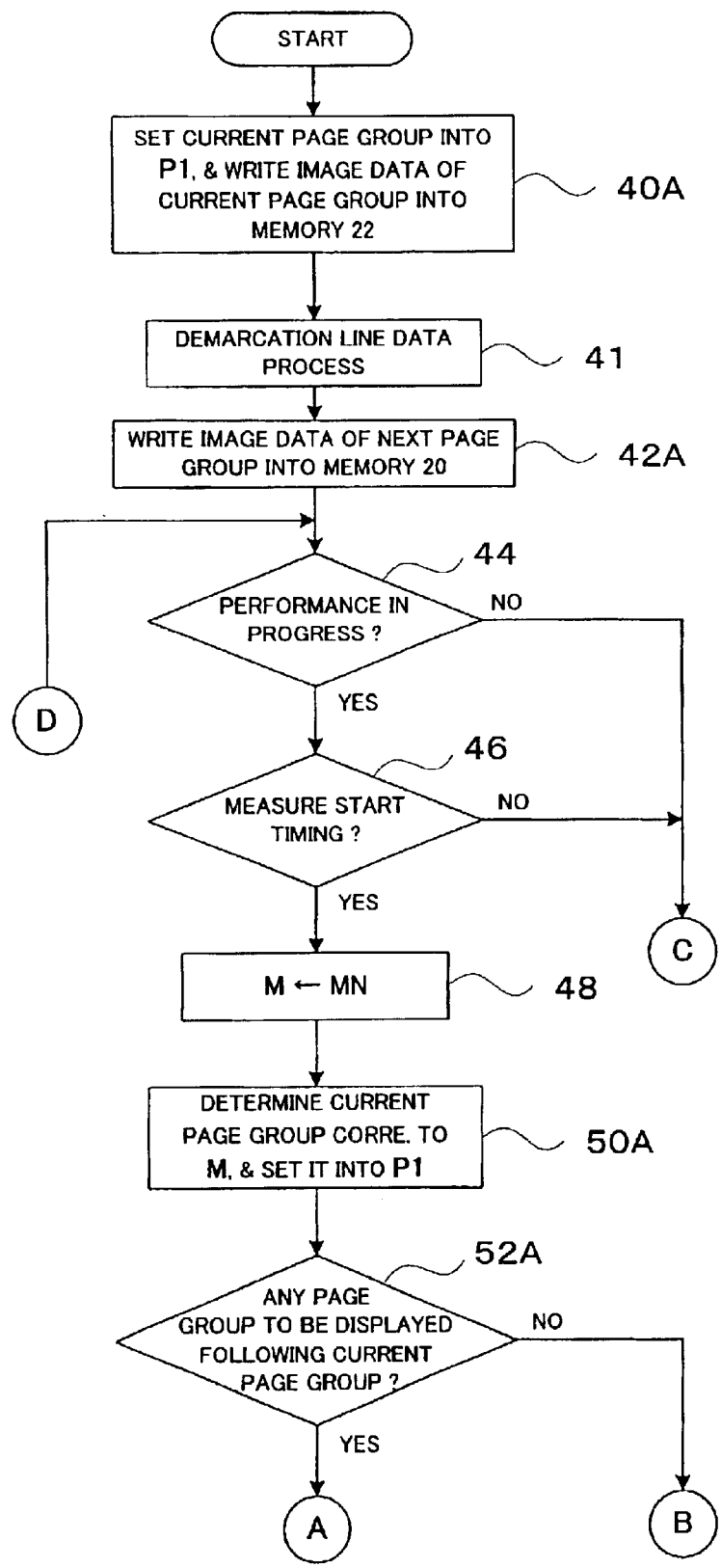
FIG. 14 is a flow chart showing a part of a musical score display process carried out in the second embodiment.
Figure 15:
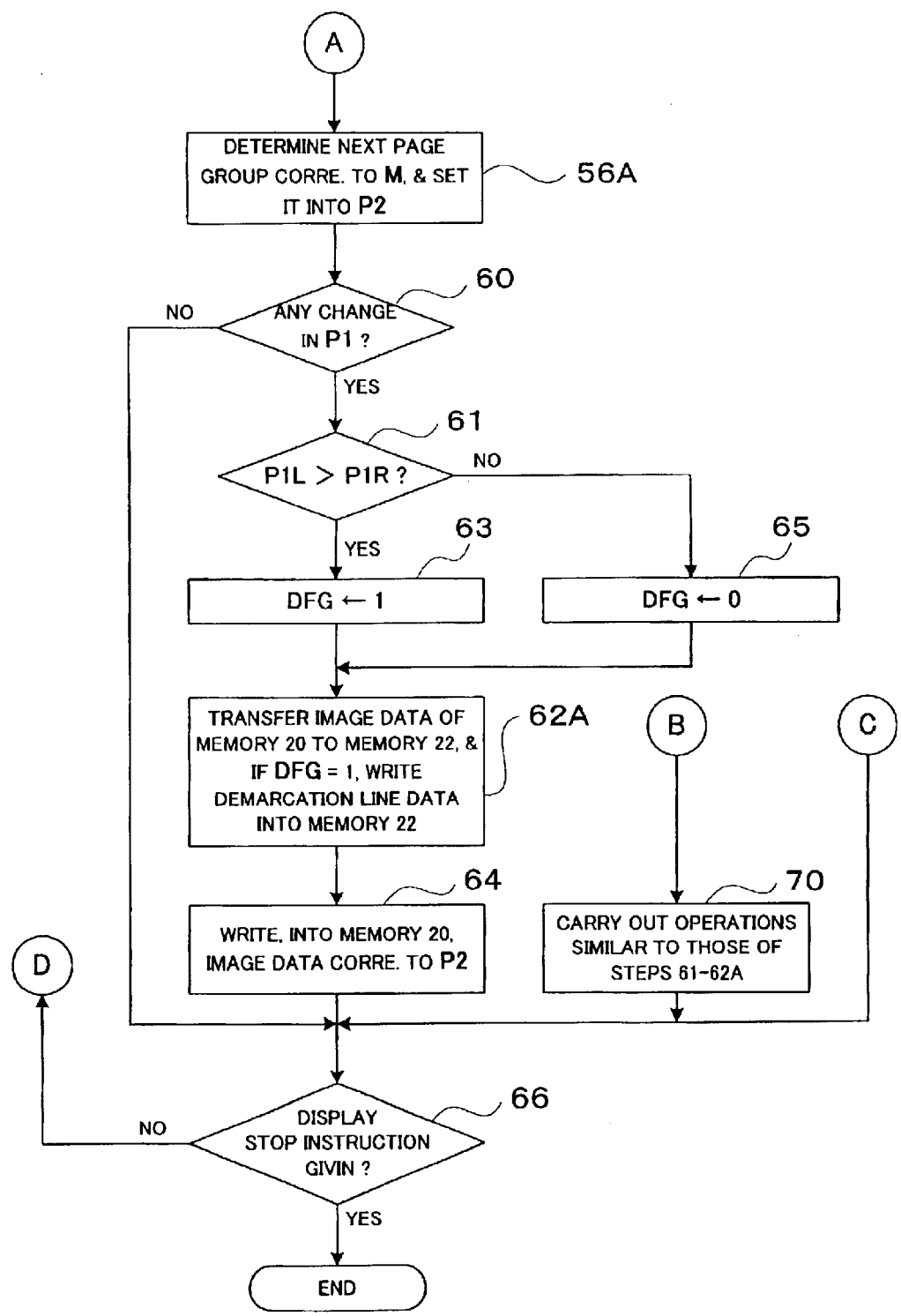
FIG. 15 is a flow chart showing the remaining part of the musical score display process.

FIGS. 14 and 15 show the musical score display process performed in the second embodiment, and this musical score display process corresponds to the above-described functions of the score output section 36 and display control section 38 in the second embodiment. The musical score display process of FIGS. 14 and 15 is started up in response to a display start instruction given by the user activating the display start/stop switch included in the operator unit 18.

At step 40A, the current page group is determined on the basis of the display progression information stored in the storage section 16C, and page numbers of the thus-determined current page group are set into the register P1. Also, at this step, the score information of the current page group, of the score information stored in the storage section 16B, is converted into image data, and the thus-converted image data are written into the display memory 22. As an example, if an automatic performance has not been initiated yet when a display start is instructed, page numbers "1" and "2" of the current page group corresponding to "performed measure 1" are determined on the basis of the display progression information stored in the storage section 16C, and the thus-determined page numbers "1" and "2" are set into the left and right portions P1L and P1R, respectively, of the register P1. Also, the score information corresponding to the page numbers "1" and "2", of the score information stored in the storage section 16B, is converted into image data, and the converted image data are written into the display memory 22. As a consequence, the score portions of the first and second pages 1p and 2p are displayed in a horizontal side-by-side relationship on the display window WD, as shown in section (B) of FIG. 12.

At next step 41, a demarcation-line displaying data process is carried out. In this demarcation-line displaying data process, a determination is made, in a similar manner to operations of steps 61, 63 and 65 to be described later, whether the value currently set in the left portion P1L of the register P1 is greater than the value currently set in the right portion P1R (i.e., whether the arranged order of the displayed score portions does not conform to the ascending order of the page numbers). If an affirmative determination is made here, a value "1" is set into the demarcation line flag DFG, but if answered in the negative, a value "0" is set into the demarcation line flag DFG. Then, if the demarcation line flag DFG is at the value "1", the demarcation-line displaying data is written into the display memory 22. But, if the demarcation line flag DFG is at the value "0", such demarcation-line displaying data is not written into the display memory 22; thus, no demarcation line DL is displayed.

At step 42A, a next page group is determined on the basis of the display progression information stored in the storage section 16C. Also, the score information of the thus-determined next page group, of the score information stored in the storage section 16B, is converted into image data, and the thus-converted image data are written into the display memory 22. The next page group may be determined in a similar manner to an operation of step 56A to be later described. Because the page numbers of the next page group are "3" and "2" in this case, the score information of the third and second pages 3p and 2p is converted into image data, and the thus-converted image data are written into the auxiliary memory 20.

At next step 44, a determination is made as to whether or not an automatic performance is now in progress. If no automatic performance has been started yet as in the above example, a negative (NO) determination is made at step 44, so that the display process moves on to step 66.

At step 66, it is determined whether or not a display stop instruction has been given by the user activating the display start/stop switch. If a negative (NO) determination is made at step 66, the process reverts to step 44, so as to wait for a start of an automatic performance with the score portions of the first and second pages 1p and 2p displayed on the display screen.

Once the user has given the display start instruction via the display start/stop switch included in the operator unit 18, an affirmative (YES) determination is made at step 44. Then, it is further determined at step 46 whether predetermined measure start timing has arrived, on the basis of the performed measure information MN. If answered in the negative, the display process reverts to step 44 by way of step 66.

Once the determination becomes affirmative at step 46, the display process proceeds to step 48, where the measure number designated by the performed measure information MN is set into the measure register M. Then, at step 50A, the current page group corresponding to the measure number currently set in the measure register M is determined with reference to the display progression information stored in the storage section 16C, and page numbers of the current page group are set into the register P1. At that time, the page numbers previously set in the register P1 (prior to this page number setting operation) are preserved in a predetermined register (not shown). This is because the preserved page numbers will be used to determine whether there has been any change in the values of the register P1. In the case where an automatic performance has been initiated with the score portions of the first and second pages 1p and 2p displayed on the display screen as noted above, and once the start timing of "measure 1" is detected at step 46, a measure number "1" is set into the measure register M at step 48.

At step 52A, a determination is made as to whether there is any page group to be displayed following the current page group represented by the data stored in the register P1, with reference to the display progression information stored in the storage section 16C. In the case where "1" and "2" are set in the register P1 as noted above, there exits such a page group to be displayed following the current page group, and an affirmative (YES) determination is made at step 52A. Thus, the display process moves on to step 54A of FIG. 15.

Figure 16:
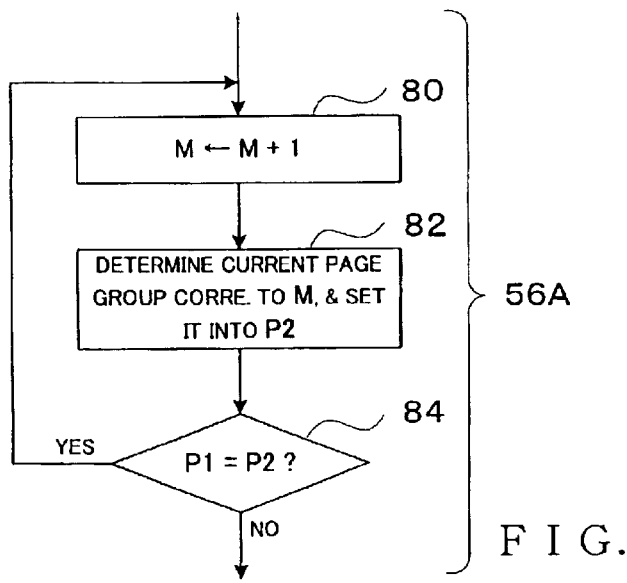
FIG. 16 is a flow chart showing details of an operation carried out at step 56A of FIG. 15.

At step 56A, the next page group corresponding to the measure number of the measure register M is determined with reference to the display progression information stored in the storage section 16C. Page numbers of the thus-determined next page group are set into the register P2. Details of step 56A are shown in FIG. 16. At step 80, the value of the measure register M is incremented by one. Then, the display process moves on to step 82, where the current page group corresponding to the current measure number of the measure register M is determined with reference to the display progression information stored in the storage section 16C and page numbers of the thus-determined current page group are set into the register P2. In the case where "1" and "2" are set in the register P1 as noted above, page numbers "1" and "2" are set into the left and right portions P2L and P2R, respectively, of the register P2 in correspondence with the value "2" currently stored in the measure register M.

Then, at step 84, a determination is made as to whether the values currently set in the left and right portions P1L and P1R of the register P1 and the values currently set in the left and right portions P2L and P2R of the register P2 are equal to each other. In the case where P1L=P2L=1 and P1R=P2R=2 as noted above, an affirmative determination is made at step 84, so that the display process reverts to step 80. Then, the operations of steps 80 to 84 are repeated for the third to fifth measures (M=3–5).

Once the display process moves to step 82 after incrementing the value of the measure register M to "six" at step 80, page numbers "3" and "2" are set into the left and right portions P2L and P2R, respectively, of the register P2. Then, at step 84, a negative determination is made at step 84 because P1L=1 and P2L=3. This means that there has been obtained a next page group (page numbers "3" and "2") different from the current page group (page numbers "1" and "2").

Referring back to FIG. 15, after completion of the operation of step 56A, the display process proceeds to step 60, where it is determined whether there has been any change in the value of the left or right portion P1L, P1R of the register P1. Namely, a comparison is made between the values P1L and P1R set in the predetermined register at step 50A and the values P1L and P1R set in the register P1 at step 50A. If any of the compared values do not match each other, an affirmative determination is made at step 60, while if the two stored page numbers match each other, a negative determination is made at step 60. If all of the compared values match each other, a negative determination is made at step 60. In the case where "1" and "2" have been set in the register P1 as noted above, a negative determination is made at step 60, so that the display process reverts to step 44 by way of step 66. Then, the determination at step 44 becomes affirmative and the determination at step 46 becomes negative, so that the display process reverts to step 44 by way of step 66 to repeat the above operations.

After that, once the predetermined start timing of "measure 2" arrives, the determination at step 46 becomes affirmative, so that the operations of steps 48 to 56A are repeated. As a consequence, the values set in the left and right portions P1L and P1R of the register P1 become "1" and "2", respectively, and also the determination at step 60 becomes negative. Similarly, when the predetermined start timing of any one of following "measure 3", measure 4" and "measure 5" has arrived, the values set in the left and right portions P1L and P1R of the register P1 become "1" and "2", respectively, and the determination at step 60 becomes negative.

Then, once the predetermined start timing of "measure 6" arrives, a measure number "6" is set into the measure register M at step 48. Then, the values set in the left and right portions P1L and P1R of the register P1 are changed to "3" and "2", respectively, at step 50A, and the values set in the left and right portions P2L and P2R of the register P2 are changed to "3" and "1", respectively, at step 56A, Then, the determination at step 60 becomes affirmative now that the value set in the left portion P1L of the register P1 has changed from "1" to "3", and thus the display process moves on to step 61. At step 61, a determination is made as to whether the value currently set in the left portion P1L of the register P1 is greater than the value currently set in the right portion P1R (i.e., whether the arranged order of the displayed score portions does not conform to the ascending or increasing order of the page numbers). If an affirmative determination is made here, a value "1" is set into the demarcation line flag DFG at step 63, but if answered in the negative, a value "0" is set into the demarcation line flag DFG at step 65.

Then, at step 62A, the image data of the auxiliary memory 20 are transferred to the display memory 22 so that score portions of a plurality of pages corresponding to the image data are displayed on the display window WD. Here, if the demarcation line flag DFG is at the value "1", the demarcation-line displaying data is written into the display memory 22 in connection with the image data from the auxiliary memory 20, while if the demarcation line flag DFG is at the value "0", the demarcation-line displaying data is not written into the display memory 22. Note that the demarcation-line displaying data can be acquired from the ROM 14.

In the case where values "3" and "2" are set in the left and right portions P1L and P1R of the register P1 and values "3" and "1" are set in the left and right portions P2L and P2R of the register P2 as noted above, the image data of the third and second pages 3p and 2p are stored in the auxiliary memory 20, so that these image data of the third and second pages 3p and 2p are transferred to the display memory 22. Further, because the value currently set in the left portion P1L of the register P1 is greater than the value currently set in the right portion P1R (P1L>P1R) (i.e., because the arranged order of the displayed score portions does not conform to the ascending order of the page numbers), the demarcation-line displaying data is written into the display memory 22. Thus, the score portions of the third and second pages 3p and 2p are displayed, side by side, on the display window WD with the demarcation line DL extending therebetween, as shown in section (C) of FIG. 12. In this instance, the score portion of the second page 2p, to which measure 6" belongs, is displayed on the right half of the display window WD; that is, the score portion of the second page 2p can be viewed on the right half of the display window WD just as in the case of "measure 1" to "measure 5".

At step 64, the score information corresponding to the page number currently set in the register P2, of the score information stored in the storage section 16B, is converted into image data, and the thus-converted image data are written into the auxiliary memory 20. In the case where values "3" and "2" are set in the left and right portions P1L and P1R of the register P1 and values "3" and "1" are set in the left and right portions P2L and P2R of the register P2 as noted above, the score information of the third and first pages 3p and 1p is converted into image data, and the thus-converted image data are written into the auxiliary memory 20.

After step 64, the process reverts to step 44 by way of step 66 and repeats the operations at and after step 44. Thus, for measures following "measure 6" too, page switching of the displayed musical score is executed in synchronism with the automatic performance in a similar manner to the above-described. In the illustrated example of FIG. 11, such page switching takes place for "measure 6", "measure 9", "measure 10", etc.

Then, once the predetermined start timing of "measure 15" arrives, a measure number "15" is set into the measure register M at step 48. Then, the values set in the left and right portions P1L and P1R of the register P1 are changed to "2" and "3", respectively, at step 50A. Because there is no page group to be displayed following the page currently stored in the register P1, a negative determination is made at step 52A, so that the display process goes to step 70.

At step 70, operations similar to those of steps 61, 63, 65 and 62A are carried out. The image data of the auxiliary memory 20 are transferred to the display memory 22 so that score portions of a plurality of pages corresponding to the image data are displayed on the display window WD. Also, it is determined whether the value currently set in the left portion P1L of the register P1 is greater than the value currently set in the right portion P1R (P1L>P1R). If answered in the affirmative, the demarcation-line displaying data is written into the display memory 22 so that the demarcation line is displayed on the display window WD.

In the case where values "2" and "3" are set in the left and right portions P1L and P1R of the register P1 at step 50A as noted above, the image data of the second and first pages 2p and 1p are stored in the display memory 22, and the image data of the second and third pages 2p and 3p are stored in the auxiliary memory 22. Thus, in this case, the image data of the second and third pages 2p and 3p are transferred from the auxiliary memory 20 to the display memory 22, so that the score portions of the second and third pages 2p and 3p are displayed side by side on the display window WD. Because the value currently set in the left portion P1L of the register P1 is not greater than the value currently set in the right portion P1R, no demarcation line is displayed in this case.

After completion of step 70, the display process reverts to step 44 by way of step 66. When the start timing of any one of "measure 17" and "measure 18" has arrived, operations similar to those described above in relation to "measure 15" are carried out, and thus the score portions of the second and third pages 2p and 3p are displayed side by side on the display window WD. Once the user gives a performance stop instruction via the performance start/stop switch after termination of the automatic performance, the determination at step 44 becomes negative, so that the display process reverts to step 44 by way of step 66. In this state, the score portions of the second and third pages 2p and 3p are being displayed on the display window WD. Then, once the user gives a display stop instruction via the display start/stop switch, the determination at step 68 becomes affirmative, and then the musical score display process is brought to an end.

Whereas the second embodiment has been described above in relation to the case where the performance start instruction is given after the display start instruction, it should be appreciated that the musical score display process is performed similarly to the above-described even when the display start instruction and performance start instruction are given simultaneously.

In case the display start instruction is given after the performance start instruction, the musical score display process is carried out in the following manner.

Namely, at step 40A, a current page group is determined on the basis of the performed measure information MN and the display progression information stored in the storage section 16C, and page numbers of the thus-determined current page group are set into the current page register P1. Also, of the score information stored in the storage section 16B, the score information corresponding to the page numbers of the current page group is converted into image data, and the thus-converted image data are written into the display memory 22. Then, if it has been determined, through the demarcation-line displaying data process of step 41, that the value currently set in the left portion P1L of the register P1 is greater than the value currently set in the right portion P1R (P1L>P1R), demarcation-line displaying data is written into the display memory 22 so as to display a demarcation line DL.

As an example, if a display start instruction is given when the automatic performance has progressed to an enroute point of measure 6", page numbers "3" and "2" of the current page group are set into the left and right portions P1L and P1R, respectively, of the register P1. Also, the image data of the third and second pages 3p and 2p are written into the display memory 22, so that the score portions of the third and second pages 3p and 2p are displayed on the display window WD. Because, in this case, the value currently set in the left portion P1L of the register P1 is greater than the value currently set in the right portion P1R (P1L>P1R), demarcation-line displaying data is written into the display memory 22, and thus a demarcation line DL is displayed on the display window WD between the score portions of the third and second pages 3p and 2p as shown in section (C) of FIG. 6.

At step 42A, a next page group is determined on the basis of the performed measure information MN and the display progression information stored in the storage section 16C. Then, of the score information stored in the storage section 16B, the score information corresponding to the page numbers of the next page group is converted into image data, and the thus-converted image data are written into the auxiliary memory 20. In the case where values "3" and "2" are set in the left and right portions P1L and P1R, respectively, of the register P1 as noted above, the image data corresponding to the page numbers "3" and "1" of the next page group are written into the auxiliary memory 20, Then, once the predetermined start timing of "measure 7" arrives, a measure number "7" is set into the measure register M at step 48. Then, values "3" and "2" are set in the left and right portions P1L and P1R, respectively, of the register P1 at step 50A, and values "3" and "1" are set in the left and right portions P2L and P2R, respectively, of the register P2 at step 56A.

In this case, a negative determination is made at step 60 because there is no change in the values of both of the left and right portions P1L and P1R. Thus, the process reverts to step 44 by way of step 66. After that, operations are carried out which are similar to those having been described above in relation to the case where the performance start instruction is given after the display start instruction.

FIG. 17 shows another example of the musical score display performed in the second embodiment. Musical score MS shown in section (A) of FIG. 17 includes score portions of first, second and third pages $1p$, $2p$ and $3p$ arranged in a horizontal side-by-side relationship or layout. The first page $1p$ includes score rows $R_1$ to $R_3$ arranged in a vertical side-by-side relationship, the second page $2p$ includes score rows $R_4$ to $R_6$ arranged in a vertical side-by-side relationship, and the third page $3p$ includes score rows $R_7$ to $R_9$ arranged in a vertical side-by-side relationship. Each of the score rows of FIG. 17 may be of the same format as the score row shown in FIG. 13.

Section (B) of FIG. 17 shows the score portions of the first and second pages $1p$ and $2p$ displayed in a horizontal side-by-side layout. Section (C) of FIG. 17 shows the score portions of the third and second pages $3p$ and $2p$ displayed in a horizontal side-by-side layout through page switching that is performed in accordance with progression of an automatic performance. In the illustrated example of section (C) of FIG. 17, the arranged order of the displayed score portions does not conform to the ascending order of the page numbers, and thus a demarcation line DL is displayed on the display window WD.

FIG. 18 shows still another example of the musical score display performed in the second embodiment. Here, following the display state illustrated in section (B) of FIG. 17, the display window WD is enlarged so as to display the score portion of the third page $3p$ to the right of the score portion of the second page $2p$ in accordance with progression of an automatic performance, instead of displaying in the manner as illustrated in section (C) of FIG. 17. In displaying the score portion of the third page $3p$, a determination may be first made as to whether there is a sufficient space for displaying a score portion of one page on the display screen of the display device 30; namely, the score portion of the third page $3p$ may be displayed by enlarging the display window WD, in response to an affirmative determination that there is such a sufficient space. However, if it is determined that there is no such sufficient space, the score portions are displayed in the manner as illustrated in section (C) of FIG. 17.

Figure 19:
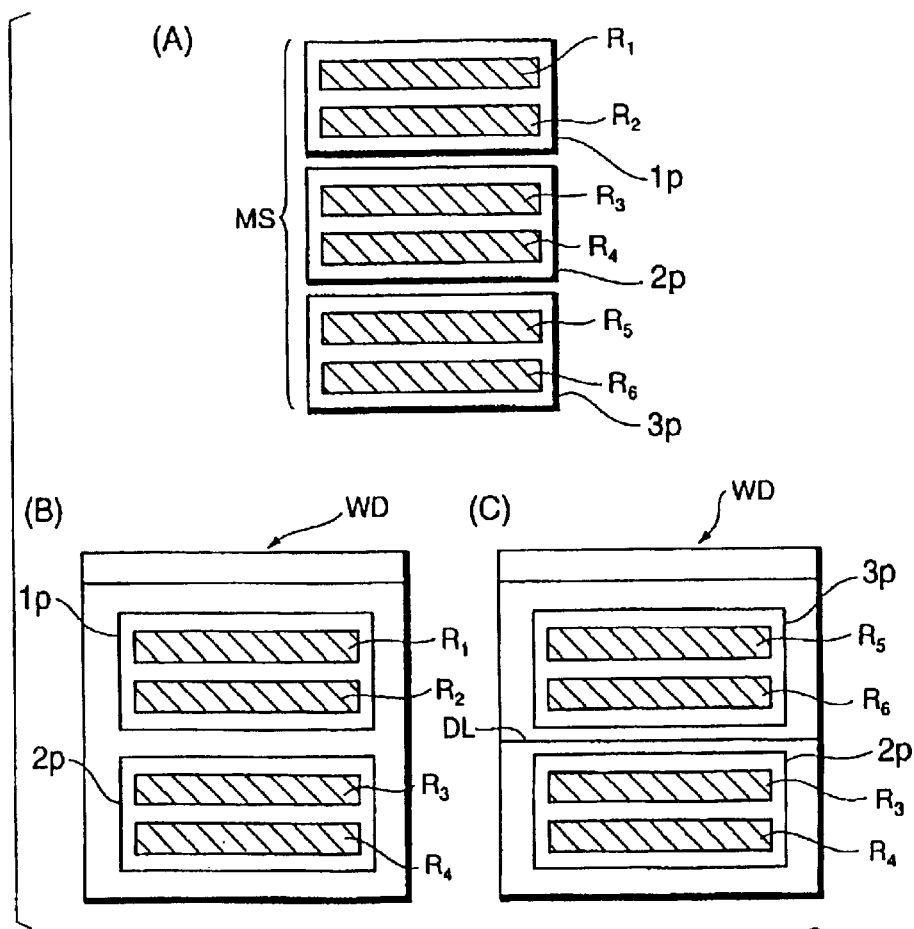
FIG. 19 is a diagram showing yet another example of the musical score display in the second embodiment.

FIG. 19 shows still another example of the musical score display performed in the second embodiment. Musical score MS shown in section (A) of FIG. 19 includes score portions of first, second and third pages $1p$, $2p$ and $3p$ arranged in a vertical side-by-side layout. The first page $1p$ includes score rows $R_1$ and $R_2$ arranged in a vertical side-by-side relationship, the second page $2p$ includes score rows $R_3$ and $R_4$ arranged in a vertical side-by-side relationship, and similarly the third page $3p$ includes score rows $R_5$ and $R_6$ arranged in a vertical side-by-side relationship. Each of the score rows of FIG. 19 may be of the same format as the score row shown in FIG. 13.

Section (B) of FIG. 19 shows the score portions of the first and second pages $1p$ and $2p$ displayed on the display window WD in a vertical side-by-side layout. Section (C) of FIG. 19 shows the score portions of the third and second pages $3p$ and $2p$ displayed in a vertical side-by-side layout through page switching that is performed in accordance with progression of an automatic performance. In the illustrated example of section (C) of FIG. 19, the arranged order of the displayed score portions does not conform to the ascending order of the page numbers, and thus a horizontal demarcation line DL is displayed on the display window WD between the score portions of the third and second pages $3p$ and $2p$.

In this embodiment, one or more score rows can be positioned in each page as shown in FIGS. 12, 17 or 18, and the number of score rows to be positioned in a given page may be selected as appropriate. Further, the number of measures to be included in a given score row may be selected as appropriate, rather than being limited to three as in the example of FIG. 13.

With the above-described second embodiment as well, it is possible to display a musical score where a performed measure shifts between displaying pages in accordance with repeat signs, for ever plurality of pages, in synchronism with an automatic performance. Further, because page designation responsive to a shift of the performed measure is executed in accordance with the display progression information prestored in the storage section 16C, the second embodiment can greatly simplify the display control process as compared to the conventional musical score display technique. In addition, by transferring, to the display memory 22, the image data stored in the auxiliary memory 20, the second embodiment can quickly switch between the pages of the musical score.

Whereas the first and second embodiments have been described above as executing an automatic performance on the basis of performance information stored in storage means, such as the storage section 16A, the automatic performance may be executed on the basis of performance event (note-on and note-off event) information etc. supplied from an automatic performance apparatus (sequencer) or the like via the communication interface 19, such as a MIDI interface, connected to the bus 10. In such a case, the CPU 12 carries out an information reception/channel assignment process instead of the above-described interrupt processing. That is, each time performance event information is received, the received performance event information is assigned to an appropriate one of the tone generating channels of the tone generator device 24, to cause the tone generating channel to generate a tone signal.

As a means for transmitting the performance event information and the like to the communication interface 19, there may be used a keyboard device instead of the automatic performance apparatus. Where the keyboard device is used like this, performance event information is transmitted to the communication interface 19 in response to manual performance operation on the keyboard device, so that the CPU 12 generates tone signals through the information reception/channel assignment process similar to the above-described.

The keyboard 17 may be connected to the bus 10, in order to generate manual performance tones. In this case, the CPU 12 carries out an information detection/channel assignment process. Namely, each time performance event information is detected from the keyboard 17, the CPU 12 assigns the detected performance event information to an appropriate one of the tone generating channels in the tone generator device 24, so as to cause the tone generating channel to generate a tone signal corresponding to the detected performance event information. Such an information detection/channel assignment process may be carried out in parallel with the above-described interrupt process or information reception/channel assignment process. In this way, the manual performance on the keyboard 17 can be carried out in parallel with an automatic performance or manual performance on the keyboard device.

In the case of the automatic performance or manual performance based on the performance event information received via the communication interface 19, or in the case of the manual performance based on the performance event information detected from the keyboard 17, the CPU 12 writes musical score information and display progression information of the music piece into the respective storage sections 16B and 16C, prior to initiation of the performance of the music piece. The tempo data generation section 25 detects a performance tempo on the basis of the performance event information and generates tempo data TMP representative of the detected performance tempo. The thus-generated tempo data TMP is supplied to the timer 26 to variably control the frequency or cyclic period of tempo clock signals TCL. For example, as the performance tempo increases (or decreases), the period of the tempo clock signals TCL is controlled to be shorter (or longer). By executing the musical score display process of FIGS. 8 and 9 using such tempo clock signals TCL, it is possible to perform the musical score display process synchronous with the performance (automatic or manual performance).

Although the embodiments of the present invention have been described in relation to an example of a musical score which is performed with the performed measure jumped on the basis of a repeat-instructing mark, Da Capo, Coda or to Coda, the present invention is not so limited; for example, the present invention may also be practiced in connection with another example of a musical score which is performed with the performed measure jumped from Dal Segno back to Segno or jumped in response to a parenthesis mark. The present invention should not be construed as limited to such embodiments where the operations as shown in FIGS. 8, 9, 14, 15 and 16 are carried out by a computer including the CPU 12; the present invention also covers, as its scope, an embodiment where the operations as shown in FIGS. 8, 9, 14, 15 and 16 are carried out by a dedicated hardware apparatus as illustrated in the block diagram of FIG. 3.

It should be appreciated that the present invention is not limited to the above embodiments and various modifications are also possible without departing from the basic principles of the invention.

(1) The display progression information may be created through software processing on the basis of the performance information stored in the storage section 16A and the score information stored in the storage section 16B, and the thus-created display progression information may be written into the storage section 16C.

(2) The display switching timing may be other than the measure start timing; for example, it may be synchronized to a time point slightly earlier or later than the measure start timing.

(3) The demarcation mark may be other than a straight demarcation line, such as a curved demarcation line or band-shaped demarcation mark.

In summary, the first embodiment of the present invention is characterized in that score-displaying image data of a displaying portion (page) are written into a first memory and score-displaying image data of a next displaying portion, determined in accordance with display progression information, are written into a second memory, and in that displaying-portion switching timing is detected on the basis of the performance progression information and display progression information so that control is performed to cause the score-displaying image data to be transferred from the second memory to the first memory in response to the detection of the displaying-portion switching timing. With such arrangements, the first embodiment can advantageously greatly simplify the display control process. Further, because the described embodiment is arranged to transfer the score-displaying image data written in the second memory to the first memory in synchronism with a performance, the first embodiment also affords the benefit that switching between the displaying portions of the musical score can be executed extremely promptly.

The second embodiment of the present invention can achieve the same benefits as the first embodiment by storing next successive displaying portions, determined in accordance with the display progression information, in the second memory. Also, because the second embodiment is arranged to display a demarcation mark between the score portions of the successive displaying portions when the score portions of the displaying portions are not displayed in ascending or increasing order of the displaying portion numbers.

The present invention relates to the subject matters of Japanese Patent Application Nos. 2001-202356 and 2001-202357 filed on Jul. 3, 2001, the disclosure of which are expressly incorporated herein by reference in its entirety.

What is claimed is:

1. A musical score display apparatus comprising:
    a performance progression information supply section that supplies performance progression information in accordance with performance progression of a given music piece;
    a score information supply section that supplies score information representative of a score of the given music piece;
    a display progression information supply section that supplies display progression information that divides the score of the music piece into a plurality of displaying portions and supplies display progression information to define a shift, in the displaying portions, of a performed measure based on a repeat sign;
    a first storage section;
    a second storage section;
    a first write section that, on the basis of the score information supplied by said score information supply section, converts score information of a current displaying portion, corresponding to current performance progression of the given music piece, into first score-displaying image data and writes said first score-displaying image data into said first storage section;

a determination section that, in accordance with the display progression information, determines a next displaying portion to be displayed following the current displaying portion;

a second write section that, on the basis of the score information supplied by said score information supply section, converts score information of the next displaying portion, determined by said determination section, into second score-displaying image data and writes said second score-displaying image data into said second storage section;

a detection section that, on the basis of the performance progression information and the display progression information, detects display switching timing at which the current performance progression of the given music piece shifts from the current displaying portion to the next displaying portion;

a transfer section that transfers said second score-displaying image data of said second storage section to said first storage section in response to detection, by said detection section, of the display switching timing, so that said first score-displaying image data written in said first storage section are replaced with said second score-displaying image data; and a display section that displays a score portion of the current displaying portion in accordance with said first score-displaying image data written in said first storage section.

2. A musical score display apparatus as claimed in claim 1 wherein the repeat sign is a musical sign instructing a shift of a performed measure, such as a repeat-instructing mark, da capo, coda or dal segno.

3. A musical score display apparatus as claimed in claim 1 wherein said score information supply section includes a memory storing the score information representative of the score of the given music piece, and said display progression information supply section includes a memory storing the display progression information of the given music piece.

4. A method for displaying a musical score on a display device comprising:

a step of supplying performance progression information in accordance with performance progression of a given music piece;

a step of supplying score information representative of a score of the given music piece;

a step of dividing the score of the music piece into a plurality of displaying portions and supplying display progression information to define a shift, in the displaying portions, of a performed measure based on a repeat sign;

a step of, on the basis of the score information supplied by said step of supplying score information, converting score information of a current displaying portion, corresponding to current performance progression of the given music piece, into first score-displaying image data and writing said first score-displaying image data into a first storage section;

a step of, in accordance with the display progression information, determining a next displaying portion to be displayed following the current displaying portion;

a step of, on the basis of the score information supplied by said step of supplying score information, converting score information of the next displaying portion, determined by said step of determining, into second score-displaying image data and writing said second score-displaying image data into a second storage section;

a step of, on the basis of the performance progression information and the display progression information, detecting display switching timing at which the current performance progression of the given music piece shifts from the current displaying portion to the next displaying portion; and a step of transferring said second score-displaying image data of said second storage section to said first storage section in response to detection of the display switching timing, so that said first score-displaying image data written in said first storage section are replaced with said second score-displaying image data;

wherein said display device displays a score portion of the current displaying portion in accordance with said first score-displaying image data written in said first storage section.

5. A computer program comprising computer program code means for performing all the steps of claim 4 when said program is run on a computer.

6. A musical score display apparatus comprising:

a display device;

a first storage section;

a second storage section;

a performance progression information supply section that supplies performance progression information in accordance with performance progression of a given music piece;

a score information supply section that supplies score information representative of a score of the given music piece;

a display progression information supply section that supplies display progression information that divides the score of the music piece into a plurality of displaying portions and supplies display progression information to define a shift, in the displaying portions, of a performed measure based on a repeat sign; and a processor coupled with said first storage section, said second storage section, said performance progression information supply section, said score information supply section and said display progression information supply section, said processor being adapted to:

on the basis of the score information supplied by said score information supply section, convert score information of a current displaying portion, corresponding to current performance progression of the given music piece, into first score-displaying image data;

store said first score-displaying image data in said first storage section;

in accordance with the display progression information, determine a next displaying portion to be displayed following the current displaying portion;

on the basis of the score information supplied by said score information supply section, convert score information of the determined next displaying portion into second score-displaying image data;

store said second score-displaying image data in said second storage section;

on the basis of the performance progression information and the display progression information, detect display switching timing at which the current performance progression of the given music piece shifts from the current displaying portion to the next displaying portion; and transfer said second score-displaying image data of said second storage section to said first storage section in response to detection of the display switching timing so that said first score-displaying image data stored in said first storage section are replaced with said second score-displaying image data, wherein said display device displays a score portion of the current displaying portion in accordance with said first score-displaying image data stored in said first storage section.

7. A musical score display apparatus comprising:

a performance progression information supply section that supplies performance progression information in accordance with performance progression of a given music piece, a score information supply section that supplies score information representative of a score of the given music piece;

a display progression information supply section that divides the score of the music piece into a plurality of displaying portions and supplies display progression information defining a shift, in the displaying portions, of a performed measure based on a repeat sign;

a first storage section;

a second storage section;

a first write section that converts score information of a first predetermined score displaying section, of the score information supplied by said score information supply section, into first score-displaying image data, said first predetermined score displaying section being composed of a predetermined number of displaying portions corresponding to a performance sequence of the given music piece, and then writes said first score-displaying image data into said first storage section;

a display section that, in accordance with said first score-displaying image data written in said first storage section, displays, in a side-by-side relationship, score portions of the predetermined number of displaying portions corresponding to said first score-displaying image data;

a determination section that, in accordance with the display progression information, a second predetermined score displaying section to be displayed following said first predetermined score displaying section, said second predetermined score displaying section being composed of a predetermined number of displaying portions corresponding to the performance sequence of the given music piece, said second predetermined score displaying section including at least one of the displaying portions of said first predetermined score displaying section that is to be performed last in said first predetermined score displaying section and a displaying portion to be performed following the one displaying portion;

a second write section that converts score information of said second predetermined score displaying section, of the score information supplied by said score information supply section, into second score-displaying image data, and then writes said second score-displaying image data into said second storage section;

a detection section that detects display switching timing on the basis of the performance progression information and the display progression information; and a transfer section that transfers said second score-displaying image data of said second storage section to said first storage section in response to detection, by said detection section, of the display switching timing, so that said first score-displaying image data written in said first storage section are replaced with said second score-displaying image data to thereby switch displayed contents on said display section.

8. A musical score display apparatus as claimed in claim 7 which further comprises:

a data generation section that detects when arranged order, on said display section, of the predetermined number of displaying portions corresponding to said second score-displaying image data written in said second storage section does not conform to predetermined order, and generates predetermined demarcation-mark displaying data in response to detection of the arranged order not conforming to the predetermined order; and a demarcation-mark display control section that, when said second score-displaying image data corresponding to the demarcation-mark displaying data generated by said data generation section are transferred to said first storage section to replace said first score-displaying image data, writes the demarcation-mark displaying data into said first storage section, to thereby allow a predetermined demarcation mark to be displayed on said display section in accordance with the demarcation-mark displaying data written in said first storage section.

9. A musical score display apparatus as claimed in claim 7 wherein the repeat sign is a musical sign instructing a shift of a performed measure, such as a repeat-instructing mark, da capo, coda or dal segno.

10. A method for displaying a musical score on a display device comprising:

a step of supplying performance progression information in accordance with performance progression of a given music piece;

a step of supplying score information representative of a score of the given music piece;

a step of dividing the score of the music piece into a plurality of displaying portions and supplying display progression information defining a shift, in the displaying portions, of a performed measure based on a repeat sign;

a step of converting score information of a first predetermined score displaying section, of the score information supplied by said score information supply section, into first score-displaying image data, said first predetermined score displaying section being composed of a predetermined number of displaying portions corresponding to a performance sequence of the given music piece, and then writing said first score-displaying image data into said first storage section;

a step of, in accordance with said first score-displaying image data written in said first storage section, displaying, in a side-by-side relationship, score portions of the predetermined number of displaying portions corresponding to said first score-displaying image data;

a step of, in accordance with the display progression information, displaying a second predetermined score displaying section to be displayed following said first predetermined score displaying section, said second predetermined score displaying section being composed of a predetermined number of displaying portions corresponding to the performance sequence of the given music piece, said second predetermined score displaying section including at least one of the displaying portions of said first predetermined score displaying section that is to be performed last in said first predetermined score displaying section and a displaying portion to be performed following the one displaying portion;

a step of converting score information of said second predetermined score displaying section, of the score information supplied by said step of supplying score information, into second score-displaying image data, and then writing said second score-displaying image data into a second storage section;

a step of detecting display switching timing on the basis of the performance progression information and the display progression information; and a step of transferring said second score-displaying image data of said second storage section to said first storage section in response to detection, by said step of detecting, of the display switching timing, so that said first score-displaying image data written in said first storage section are replaced with said second score-displaying image data to thereby switch displayed contents on said display device.

11. A computer program comprising computer program code means for performing all the steps of claim 10 when said program is run on a computer.

12. A musical score display apparatus comprising:

a display device;

a first storage section;

a second storage section;

a performance progression information supply section that supplies performance progression information in accordance with performance progression of a given music piece;

a score information supply section that supplies score information representative of a score of the given music piece;

a display progression information supply section that divides the score of the music piece into a plurality of displaying portions and supplies display progression information defining a shift, in the displaying portions, of a performed measure based on a repeat sign; and a processor coupled with said first storage section, said second storage section, said performance progression information supply section, said score information supply section and said display progression information supply section, said processor being adapted to:

convert score information of a first predetermined score displaying section, of the score information supplied by said score information supply section, into first score-displaying image data, said first predetermined score displaying section being composed of a predetermined number of displaying portions corresponding to a performance sequence of the given music piece;

write said first score-displaying image data into said first storage section;

in accordance with said first score-displaying image data written in said first storage section, causes said display device to display, in a side-by-side relationship, score portions of the predetermined number of displaying portions corresponding to said first score-displaying image data;

in accordance with the display progression information, determine a second predetermined score displaying section to be displayed following said first predetermined score displaying section, said second predetermined score displaying section being composed of a predetermined number of displaying portions corresponding to the performance sequence of the given music piece, said second predetermined score displaying section including at least one of the displaying portions of said first predetermined score displaying section that is to be performed last in said first predetermined score displaying section and a displaying portion to be performed following the one displaying portion;

convert score information of said second predetermined score displaying section, of the score information supplied by said score information supply section, into second score-displaying image data;

write said second score-displaying image data into said second storage section;

detect display switching timing on the basis of the performance progression information and the display progression information; and transfer said second score-displaying image data of said second storage section to said first storage section in response to detection of the display switching timing, so that said first score-displaying image data written in said first storage section are replaced with said second score-displaying image data to thereby switch displayed contents on said display device.

* * * * *